(12) United States Patent
Davidson et al.

(10) Patent No.: US 10,868,827 B2
(45) Date of Patent: *Dec. 15, 2020

(54) BROWSER EXTENSION FOR CONTEMPORANEOUS IN-BROWSER TAGGING AND HARVESTING OF INTERNET CONTENT

(71) Applicant: OpSec Online Limited, Washington (GB)

(72) Inventors: Joshua Alan Davidson, Meridian, ID (US); Jeremy Lee Epstein, Williamsville, NY (US)

(73) Assignee: OpSec Online Limited, Washington (GB)

( * ) Notice: Subject to any disclaimer, the term of this patent is extended or adjusted under 35 U.S.C. 154(b) by 3 days.

This patent is subject to a terminal disclaimer.

(21) Appl. No.: 16/261,001

(22) Filed: Jan. 29, 2019

(65) Prior Publication Data

US 2019/0158532 A1 May 23, 2019

Related U.S. Application Data

(63) Continuation of application No. 15/280,476, filed on Sep. 26, 2016, now Pat. No. 10,237,299.

(51) Int. Cl.
| | |
|---|---|
| *H04L 29/06* | (2006.01) |
| *G06F 16/951* | (2019.01) |
| *G06F 16/955* | (2019.01) |
| *G06F 21/57* | (2013.01) |
| *G06F 16/958* | (2019.01) |

(Continued)

(52) U.S. Cl.
CPC ........ *H04L 63/1441* (2013.01); *G06F 16/951* (2019.01); *G06F 16/957* (2019.01); *G06F 16/9566* (2019.01); *G06F 16/986* (2019.01); *G06F 21/577* (2013.01); *G06F 40/14* (2020.01); *H04L 63/1425* (2013.01); *H04L 67/22* (2013.01); *G06F 2221/2119* (2013.01); *H04L 67/02* (2013.01); *H04L 67/42* (2013.01)

(58) Field of Classification Search
CPC . H04L 63/1441; H04L 63/1425; H04L 67/22; H04L 67/02; H04L 67/42; G06F 40/14; G06F 16/986; G06F 16/957; G06F 16/951; G06F 16/9566; G06F 21/577; G06F 2221/2119

See application file for complete search history.

(56) References Cited

U.S. PATENT DOCUMENTS

| | | | |
|---|---|---|---|
| 8,707,163 B2 * | 4/2014 | Boudville | G07F 19/201 715/234 |
| 9,038,184 B1 | 5/2015 | Mann | |

(Continued)

OTHER PUBLICATIONS

Extended European Search Report issued from related European patent application No. 17194218.8 dated Feb. 22, 2018.

(Continued)

*Primary Examiner* — Meng Li
(74) *Attorney, Agent, or Firm* — McCarter & English, LLP

(57) ABSTRACT

Exemplary embodiments of the present disclosure relate to systems, methods, and non-transitory computer-readable media for contemporaneous in-browser searching, viewing, tagging, and harvesting digital content in a networked environment, and for removing malignant content from the networked environment.

23 Claims, 17 Drawing Sheets

(51) Int. Cl.
   *G06F 16/957*    (2019.01)
   *G06F 40/14*     (2020.01)
   *H04L 29/08*     (2006.01)

(56) References Cited

U.S. PATENT DOCUMENTS

| | | |
|---|---|---|
| 2005/0235351 A1 | 10/2005 | Seltzer et al. |
| 2007/0153752 A1* | 7/2007 | Donnellan .......... H04L 65/4061 370/338 |
| 2011/0321160 A1* | 12/2011 | Mohandas .............. G06F 21/56 726/22 |
| 2012/0240053 A1* | 9/2012 | Shriber ............ G06F 17/30867 715/749 |
| 2016/0232144 A1 | 8/2016 | Zhou |
| 2017/0279845 A1* | 9/2017 | Chu .................... H04L 63/1441 |

OTHER PUBLICATIONS

European Office Action from related European patent application 17194218.8 dated Feb. 11, 2020.

* cited by examiner

BROWSER EXTENSION FOR CONTEMPORANEOUS IN-BROWSER TAGGING AND HARVESTING OF INTERNET CONTENT

RELATED APPLICATIONS

The present application is a continuation of U.S. patent application Ser. No. 15/280,476, filed on Sep. 29, 2016, the content of which is incorporated by reference herein in its entirety.

BACKGROUND

An overwhelming amount of digital content is available over networked environments, such as the Internet. This digital content is spread across multiple data channels and/or sources, and more and more content is being made available daily. While most of this content is credible, legitimate, or innocuous (collectively referred to herein as "benign content"), some content is infringing, fraudulent, counterfeit, malicious (e.g., including malware, viruses, etc.), or worse (collectively referred to herein as "malignant content"). In many instances, such malignant content is generated so that it appears to the lay user to be benign content. As one example, malignant content can be generated to replicate benign content and/or can have other hallmarks commonly associated with benign content. As another example, malignant content can be incorporated into or can otherwise originate from a data channel or source that is commonly associated with benign content (e.g., where the data channel or source allows third parties to add content to the data channel or source). Often identifying, tracking, and remedying malignant content in networked environments, such as the Internet, is a moving target given the fluidity with which content can be added or removed from one or more Internet data channels or sources.

SUMMARY

While some systems perform bulk pre-harvesting of digital content based on one or more searches, and subsequently perform an "offline" analysis of the digital content, this approach can be inefficient and resource intensive. Additionally, while bulk pre-harvesting of digital content can be an effective method of gathering large swaths of digital content, such bulk harvesting may not find relevant digital content and/or the pre-harvested digital content may not be up-to-date (e.g., the digital content may change after the digital content is pre-harvested).

Exemplary embodiments of the present disclosure advantageously address problems associated with detection and tracking malignant content on the Internet or other networked environments. For example, exemplary systems, methods, and computer-readable media are described herein that provide for contemporaneous in-browser, searching, viewing, tagging and harvesting of content in networked environments while potentially avoiding large bulk harvesting of content and/or filling the gaps in bulk harvested content.

Exemplary embodiments of the present disclosure can advantageously provide for brand protection in networked environments by providing the ability to contemporaneous in-browser, searching, viewing, tagging and harvesting of content in networked environments while potentially avoiding large bulk harvesting of content and/or filling the gaps in bulk pre-harvested content. In an exemplary application, embodiments of the present disclosure can be implemented to address malignant content in webpages of online marketplace and/or auction websites in real-time.

In accordance with embodiments of the present disclosure, a method for contemporaneous in-browser tagging and harvesting of digital content in a networked environment is disclosed. The method includes executing a browser extension to extend the functionality of a web browser. The browser extension includes a user interface and a background process. The method also includes generating a graphical user interface in a portion of the browser window via the user interface of the browser extension; extracting, via the background process of the browser extension at least one uniform resource locator associated with a webpage to be rendered in the browser window in response to the web browser retrieving the webpage; and sending a message including the at least one uniform resource locator from the browser extension to a portal. The portal determines whether a record in a database corresponds to the at least one of the uniform resource locators and sends a result to the browser extension. The method further includes generating, via the background process, at least one indicator in the graphical user interface or the browser window in response to the result. A non-transitory computer-readable medium is also disclosed that includes instructions that are executable by one or more processors, wherein execution of the instructions by the one or more processors causes the one or more processors to implement the method for contemporaneous in-browser tagging and harvesting of digital content in a networked environment.

In accordance with embodiments of the present disclosure, a system for contemporaneous in-browser tagging and harvesting of digital content in a networked environment is disclosed. The system includes a remote computing system having one or more servers programmed to execute a portal accessible via a network. The system also includes at least one computing device, having installed thereon, a web browser and a browser extension, wherein the browser extension is programmed to extend the functionality of the web browser. The at least one computing device is programmed to execute the browser extension to generate a graphical user interface of the browser extension in a portion of a browser window; extract at least one uniform resource locator associated with a webpage to be rendered in the browser window in response to the web browser retrieving the webpage; and send a message including the at least one uniform resource locator from the browser extension over the network to the one or more servers for processing by the portal. The one or more servers execute the portal to determine whether a record in a database corresponds to the at least one of the uniform resource locators and to send a result of the determination to the at least one computing device for processing by the browser extension. The at least one computing device is further programmed to execute the browser extension to generate, via the browser extension, at least one indicator in the graphical user interface or the browser window in response to the result.

In accordance with embodiments of the present disclosure, at least one of the URLs does not have a corresponding record in the database, and a record for the at least one of the URLs is created in the database in response to input received from a user via the graphical user interface of the browser extension. One or more tags can be added to the record based on input received from the user via the graphical user interface, and at least one of the tags can indicate whether the webpage associated with the at least one of the URLs includes benign or malignant content. The at least one indicator can be a color of at least a portion of the graphical user interface of the browser extension and the color of the portion of the graphical user interface can be changed to indicate that the webpage associated with the at least one of the URLs includes benign or malignant content.

In accordance with embodiments of the present disclosure, an image of the webpage can be captured via the graphical user interface of the browser extension, and the image can be transmitted from the browser extension to a data source of the webpage in response to selection of an option in the graphical user interface by a user.

In accordance with embodiments of the present disclosure, the at least one of the URLs can have a corresponding record in the database and the graphical user interface of the browser extension can be populated with tags retrieved from the record that are included in the result.

In accordance with embodiments of the present disclosure, the at least one of the URLs can identify the webpage, and the at least one indicator can be inserted into a browser tab of the web browser to indicate that the webpage associated with the at least one of the URLs includes benign or malignant content based on the result received by the browser extension from the portal. Inserting the at least one indicator into the browser tab can be performed by modifying source code associated with the webpage to include the at least one indicator in the browser tab.

In accordance with embodiments of the present disclosure, the at least one of the URLs associated with the webpage can correspond to at least one link embedded in the webpage, and at least one link embedded in the webpage is directed to benign or malignant content based on the result received by the browser extension from the portal. Inserting at least one indicator into the webpage can be performed by modifying, via the background process, a source code associated with the webpage to include the at least one indicator in the webpage.

In accordance with embodiments of the present disclosure, multiple webpages can be open in multiple browser windows or browser tabs; and the browser extension can perform at least one collective action on at least a subset of the browser windows or browser tabs in response to input from the user received via the graphical user interface of the browser extension.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

In the drawings, like reference numerals refer to like parts throughout the various views of the non-limiting and non-exhaustive embodiments.

FIGS. 5-10 illustrate exemplary implementations of embodiments of a browser extension in accordance with embodiments of the present disclosure.

DETAILED DESCRIPTION

Exemplary embodiments of the present disclosure relate to systems, methods, and non-transitory computer-readable media for contemporaneous in-browser searching, viewing, tagging, and harvesting digital content in a networked environment, and ultimately for removing malignant content from the networked environment.

Figure 1:
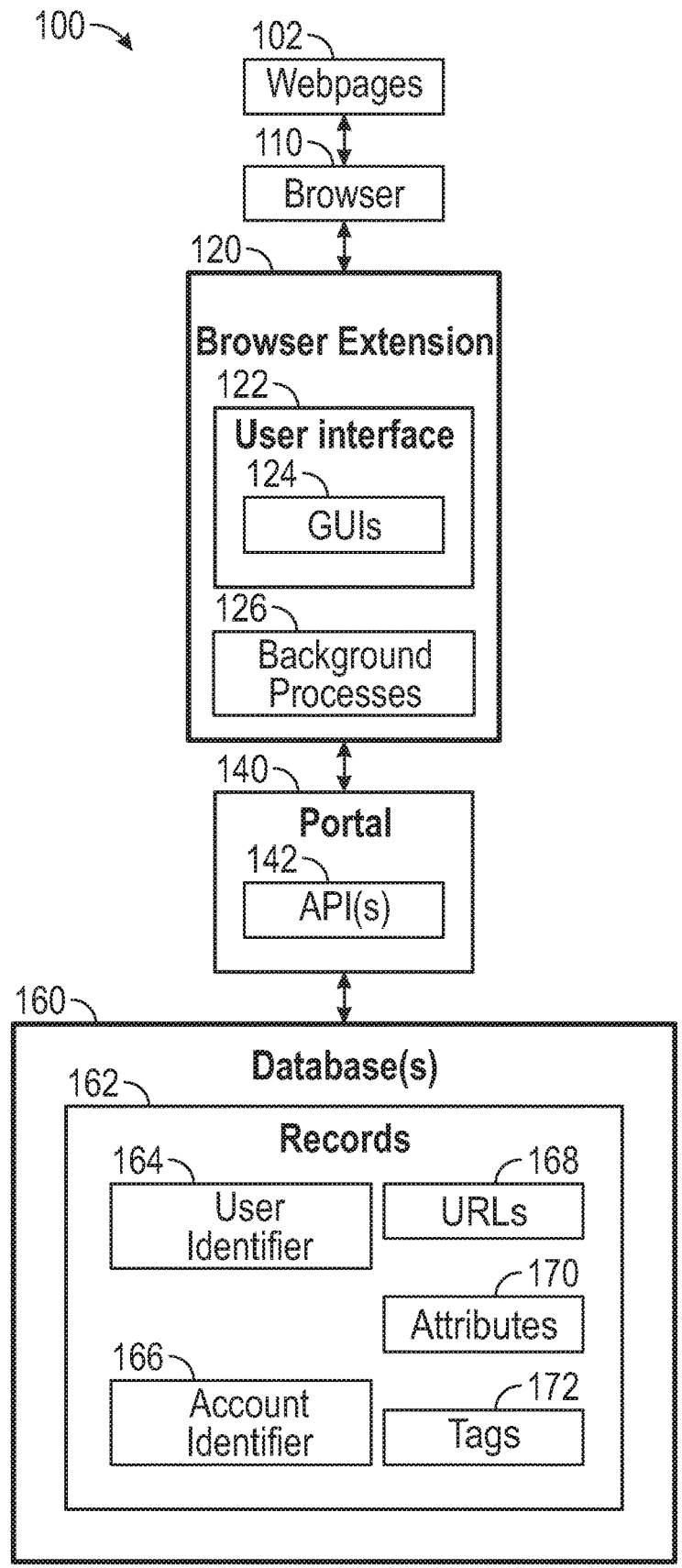
FIG. 1 is a block diagram of an exemplary environment for contemporaneous in-browser searching, viewing, tagging, and harvesting digital content in a networked environment in accordance with embodiments of the present disclosure.

FIG. 1 is a block diagram of an environment 100 for contemporaneous in-browser searching, viewing, tagging, and harvesting of digital content in accordance with embodiments of the present disclosure. As shown in FIG. 1, the environment 100 can include a web browser 110 configured to retrieve and display digital content hosted by one or more servers based on uniform resource identifiers (URIs) or uniform resource locators (URLs) associated with the digital content. For example, the web browser 110 can query one or more webservers hosting digital content in the form of one or more webpages 102 using URIs or URLs, and can retrieve and display the one or more webpages 102 based on the URIs or URLs. The digital content can have one or more file formats, such as hypertext mark-up language files, extensible mark-up language files, portable document (PDF) files, image files, audio files, video files, and/or other formats.

The web browser 110 can process the files retrieved from one or more servers to display the digital content to a user. In some instances, one or more plug-ins (e.g., Flash applications, Java applets) can be used by the web browser 110 to process files and display the digital content to the user. For example, the plug-ins can allow the web browser to process webpages 102 that embed content that it would otherwise not be able to process, e.g., Flash videos, portable document formats (PDFs), or Java applets. The web browser 110 can be configured to open digital content in multiple browser windows or browser tabs at the same time. For example, the web browser 110 can be configured to open multiple webpages 102 at the same time, either in different browser windows or in different tabs of the same window.

In exemplary embodiments, the web browser 110 can be configured to load a browser extension 120 that can be executed in the browser context to extend the functionality of the web browser 110. For example, the browser extension 120 can be downloaded and installed on a computing resource executing the web browser 110, and the web browser 110 can call or invoke the browser extension 120 when the computing resource launches the web browser 110 to integrate the functionality of the browser extension 120 into the web browser 110. The browser extension 120 can include a user interface 122 configured to generate one or more graphical user interfaces 124, and background processes 126.

The browser extension 120 can extend the functionality of the web browser 110 to provide a dynamic browsing environment in which the web browser 110 and the browser extension 110 respond to the digital content being display in a browser window of the web browser 110 and/or the URL associated with the digital content being displayed. In exemplary embodiments, the dynamic behavior of the web browser 110 and the browser extension 120 can be achieve in response to an interaction between the browser extension and a portal 140 accessible by the browser extension 120 via a networked environment.

To facilitate access to the portal 140, via execution of the browser extension 120, the browser extension 120 can be programmed to prompt a user for a username, account identifier, password, and/or other credentials. Once a user inputs the user credentials, the browser extension 120 can transmit the user credentials to the portal 140 for authentication, and the portal 140 can respond by granting or denying the browser extension 120 access to the portal 140. After the user credentials have been verified and the browser extension 120 has been granted access to the portal 140, the browser extension 120 can be executed in conjunction with the web browser 110 and the portal 140 to facilitate contemporaneous in-browser searching, viewing, tagging, and harvesting content in a networked environment, and ultimately, to facilitate removal of malignant content from the networked environment. In some embodiments, once access to the portal 140 is granted to the browser extension 120, the portal 140 can create a session (and associated session identifier) between the portal 140 and the browser extension 120 to facilitate stateful communications between the portal 140 and the browser extension 120. In some embodiments, once access to the portal 140 is granted to the browser extension 120, the portal 140 can generate a token and transmit the token to the browser extension 120. Each time the browser extension 120 sends a message to the portal 140, the message can include the token to facilitate to access to the portal 140 with stateful and/or stateless communication.

The portal 140 can include one or more application program interfaces (APIs) 142 that are configured to interface with the browser extension 110. The API(s) 142 can process messages received from the browser extension 120 and can transmit responses to the browser extension 120. The portal 140 can include one or more databases 160 that include, for each user identifier and/or account identifier, a set of records corresponding to URLs that have been processed by the browser extension 120 and/or the portal 140 for that user identifier and/or account identifier. Each record can include fields for attribute(s) extracted from digital content corresponding to the URL associated with the records and can include fields for tags assigned to the URL associated with the record. Thus, each record 162 in the database 160 may include a user identifier 164, an account identifier 166, a URL 168, attributes 170 extracted from the digital content associated with the URL, and/or tags 172 assigned to the URL. In addition to these fields, each record can include a date the record was last updated.

Referring again to the browser extension 120, the one or more graphical user interfaces 124 can be embedded in a window of the web browser 110 (e.g., as a frame) and can allow users to interact with the browser extension 120. In some embodiments, the one or more graphical user interfaces 124 can be generated as separate browser windows such that the one or more graphical user interfaces 124 are formed as separate and distinct browser windows.

The one or more graphical user interfaces 124 can include data output areas to display information to users as well as data entry fields to receive information from the users. Some examples of data output areas can include, but are not limited to text, graphics (e.g., graphs, maps—geographic or otherwise, images, and the like), and/or any other suitable data output areas. Some examples of data entry fields can include, but are not limited to text boxes, check boxes, buttons, dropdown menus, and/or any other suitable data entry fields.

The background processes 126 can be executed in the context of the web browser 110 to interact with the digital content being displayed in the browser window(s) and with the portal 140. For example, the background processes 126 can send messages to the API(s) 142 of the portal 140 to request information from the portal 140 when the web browser 120 navigates to a URL, and can use information received from the portal 140 to modify a presentation of the digital content associated with the URL in the browser window and/or to insert information into the one or more graphical user interfaces 124 of the browser extension.

For example, in an exemplary operation, when an instance of the web browser 110 is launched, the web browser 110 load an instance of the browser extension 120 such that the user interface 122 and the background processes are executed in conjunction with the web browser 110. The browser extension 120 requests (e.g., via the one or more graphical interfaces 124) user credentials from a user of the web browser 110. Upon receipt of the user credentials, the background processes 126 of the browser extension can attempt to establish a connection with the portal 140 by transmitting a message to the portal 140 including the user credentials. After the portal 140 authenticates the user credentials, the portal transmits a message back to the browser extension 120 indicating that a connection has been established between the browser extension 120 and the portal 140.

Subsequently, the web browser 110 can navigate to a webpage 102 having an associated URL. In response to the web browser 110 navigating to the webpage 102, the background processes 126 of the browser extension 120 incorporates the URL of the webpage into a message, and transmits the message to the API(s) 142 of the portal 140. The API(s) 142 create one or more database queries based on the message. The one or more database queries can be structured to search a database for records associated with the URL received in the message that are specific to the user identifier and/or account number associated with the established connection between the portal 140 and the browser extension 120 (e.g., the database queries can be configured to search for a record correspond to the URL in a set of records associated with the user of the web browser 110 and browser extension 120).

The results of the one or more queries can be transmitted back to the background processes 126 of the browser extension 120 by the API(s) 142 of the portal 140. As one example, if no record corresponding to the URL was returned in response to the one or more queries, the API(s) 142 can transmit a message that indicates that there is no record for the URL (e.g., the message can include a null set for the results). In response to receiving the message indicating that no record was found, the background processes 126 can control the one or more graphical user interfaces 124 to generate an indicator to the user that there is no records for the URL and/or can modify the presentation of the webpage or the browser tab associated with the webpage to insert an indicator that indicates that there is no record for the URL. In exemplary embodiments, the indicator can be a graphical icon and the presentation of the webpage can be modified by modifying the source code associated with the webpage to insert the indicator.

As another example, if a record corresponding to the URL is returned in response to the one or more queries, the API(s) 142 can transmit a message that indicates there is a record for the URL. The message can include the information included in the record corresponding to the URL. For example, the message can include any tags stored in the record. In response to receiving the message indicating that a record was found, the background processes 126 can control the one or more graphical user interfaces 124 to display the tags associated with the URL and/or can modify the presentation of the webpage or the browser tab associated with the webpage to insert an indicator that corresponds to one of the tags (e.g., a benign content tag, an infringing content tag, a counterfeit content tag, a malicious content tag) assigned to the URL. In exemplary embodiments, the indicator can be a graphical icon and the presentation of the webpage can be modified by modifying the source code associated with the webpage to insert the indicator.

In some instances, the URL to which the web browser 110 navigates can include links to the other webpages embedded in the webpage corresponding to the URL. As a non-limiting example, in response to submission of a search string to a search engine, the web browser 110 can be directed to a URL by the search engine that includes a list of results found by the search engine based on the search string. The webpage including the list of results can include embedded links that can be selected to cause the web browser 110 to navigate to the URL associated with the select link. For webpages that include embedded links corresponding to additional URLs, exemplary embodiments of the back processes 126 can extract the URLs associated with the links from the source code of the webpage and can include the URLs in a message to the API(s) 142 of the portal 140, which can generate one or more queries based on the URLs.

The results of the one or more database queries can be transmitted back to the background processes 126 of the browser extension 120 by the API(s) 142 of the portal 140. As one example, the API(s) 142 can transmit a message that includes the results of the database queries for each URL identified in the embedded links. The background processes 126 process the results for each URL and can modify the presentation of the webpage or the browser tab associated with the webpage to insert indicators that indicates a current tag value for one of the tags in the records corresponding to the URLs (e.g., unknown tag, benign tag, infringing tag, counterfeit tag, malicious tag). For example, the background processes 126 can modify the in-memory version of the source code of the webpage to insert the indicators corresponding to the current tag value such that upon rendering of the webpage including the embedded links, the indicator associated with each URL is disposed adjacent to the link referencing the URL. The in-memory version of the source code can be an instance of the source code retrieved by the web browser 110 from the data source that is stored in memory on the device executing the web browser 110. For URLs that have no record in the database 160 and have not been assigned a benign, infringing, counterfeit, or malicious tag, background processes 126 can insert an indicator to indicate that no tag value exist for the URL (e.g., the status of the content associated with the URL is unknown).

In exemplary embodiments, the one or more graphical user interfaces 124 of the browser extension 120 can allow a user to generate one or more tags for a webpage being displayed by the web browser 110. For example, when the web browser 110 navigates to the webpage, the background processes 126 interact with the portal 140 based on the URL associated with the webpage to control the user interface to generate the one or more graphical user interfaces based on tags stored in a record of the database 160 that correspond to the URL of the webpage. Thus, if the URL has previously been tagged, the one or more graphical user interfaces 124 can be populated with the tags and if the URL has not previously been tagged the one or more graphical user interfaces 124 can be created to indicate that the URL has not been tagged. The one or more graphical user interface 124 can include data entry fields that allow a user to specify tags for the webpage. As a non-limiting example, the one or more graphical user interfaces 124 can include a data entry field that allows the user to specify a content tag to indicate whether the content of the webpage includes benign content or malignant content (e.g., infringing, counterfeit, malicious).

The one or more graphical user interfaces 124 can allow the user to control an operation of the browser extension 120 and the portal 140 in response to selection of one or more options presented in the one or more graphical user interfaces 124. As one example, the user can select an option in the one or more graphical user interfaces 124 that causes the background processes 126 to capture an image of the webpage, which can be stored in the database 160 and associated with a record of the URL associated with the webpage. As another example, upon the web browser 110 navigating to a webpage having a URL for which no record exists in the database 160, the user can select an option in the one or more graphical user interfaces to harvest the webpage and create a record in the data with or without specifying tags for the webpage. Harvesting a webpage can include extracting attributes from the webpage and creating a record in a database including the extracted attributes as well as a URL for the webpage from which the attributes were extracted. In response to selecting to harvest the webpage, the background processes 126 and/or the portal 140 can autonomously extract attributes from the webpage to add to the record for the URL.

The autonomous extraction of attributes from webpages can be performed using, for example, natural language processing, machine learning, similarity measures, image matching techniques, and/or pattern matching techniques to identify attributes in the results. Various algorithms and/or techniques can be utilized extract the attributes from the webpage. For example, algorithms for fuzzy text pattern matching, such as Baeza-Yates-Gonnet can be used for single strings and fuzzy Aho-Corasick can be used multiple string matching; algorithms for supervised or unsupervised document classification techniques can be employed after transforming the text documents into numeric vectors: using multiple string fuzzy text pattern matching algorithms such as fuzzy Aho-Corasick; and using topic models such as Latent Dirichlet Allocation (LDA) and Hierarchical Dirichlet Processes (HDP).

In some embodiments, the background processes 126 and/or the portal 140 can be configured to autonomously tag a webpage. For example, the background processes 126 and/or the portal 140 can be configured to utilize one or more machine learning algorithms to specify tags for the webpages, where the machine learning algorithm can be trained using a corpus of training data. In some embodiments, webpages can be autonomously tagged based on specific known attributes that are associated with previously identified malignant content.

In exemplary embodiments, the browser extension 120 can be configured to control the web browser 110 so that the web browser 120 opens multiple browser windows or browser tabs and navigates to a different webpage in each browser window or browser tab. When the web browser 110 operates in this manner, exemplary embodiments of the browser extension 120 and the portal 140 can operate in the same or similar manner has as described herein when processing the URL from one webpage opened in a browser window or browser tab. After the browser extension 120 and the portal 140 communicate to determine whether a record exists in the database 160 for each of the URLs and/or whether the URLs have been tagged, the one or more graphical user interfaces 124 can be configured to allow the user to perform tagging and harvesting of the webpages individually, in groups or subsets, and/or collectively. For example, the web browser 110 can have a quantity of browser tabs open with a different webpage being rendered by each browser tab. Upon determining that all of the webpages, a subset of the webpages, or a single webpage is infringing, the user can tag all of the webpages, a subset of the webpages, or the single webpage as infringing and/or can trigger a harvesting of all of the webpages, a subset of the webpages, or the single webpage. After the webpages have been tagged (either previously or contemporaneously), the one or more graphical user interface 124 can be configured to allow the user to close one or more browser windows or browser tabs based on a value of the content tag (e.g., unknown, benign, infringing, counterfeit, malicious). As one example, the user can select an option in the one or more graphical user interfaces 124 to close all browser windows or browser tabs that are rendering webpages tagged with the infringing tag. As another example, the user can select an option in the one or more graphical user interfaces 124 to close all browser windows or browser tabs except those browser windows or browser tabs that are rendering webpages tagged with the infringing tag.

Figure 2:
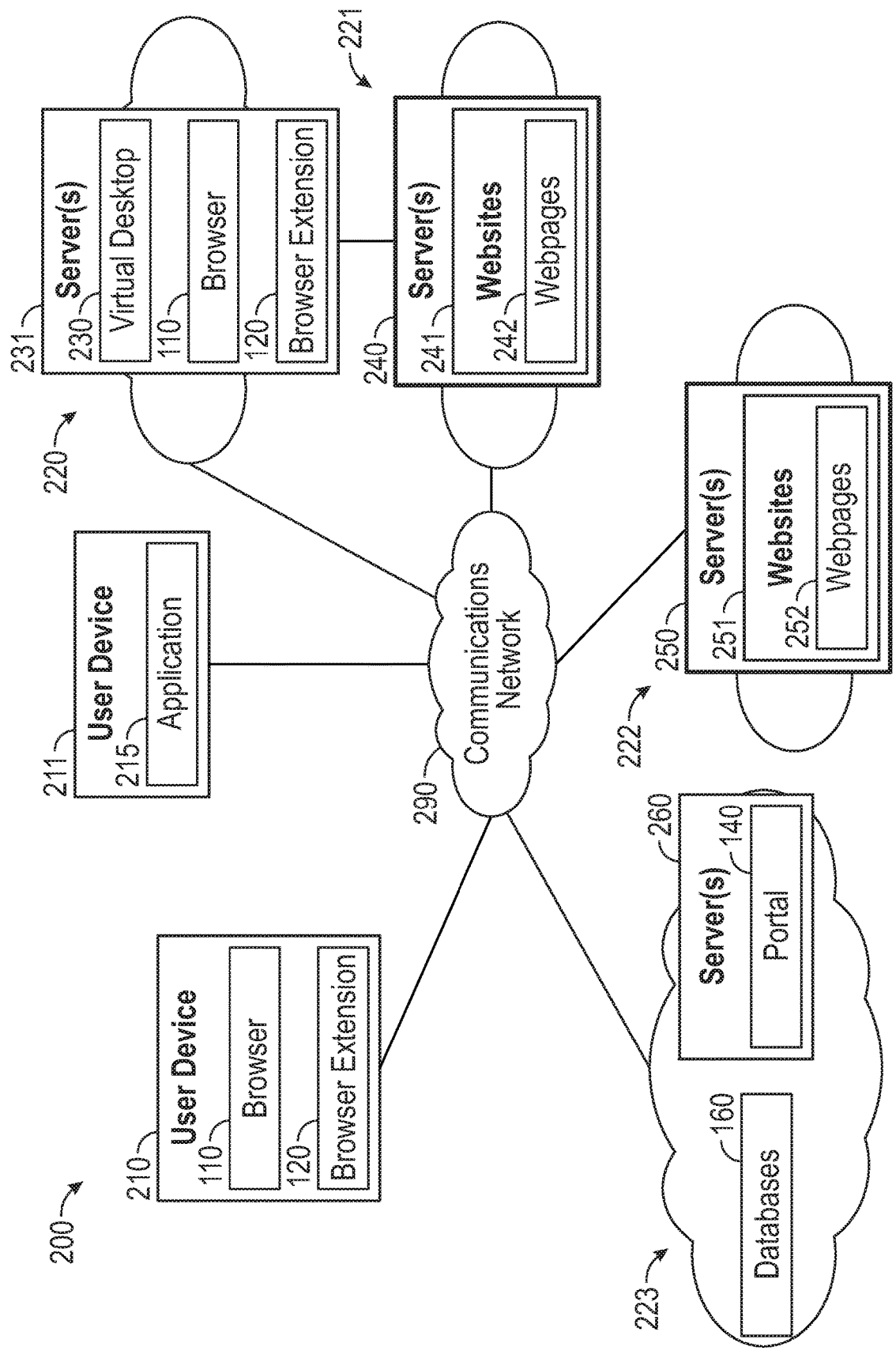
FIG. 2 is an exemplary networked environment for facilitating contemporaneous in-browser searching, viewing, tagging, and harvesting of digital content on the Internet in accordance with embodiments of the present disclosure.

FIG. 2 is an exemplary networked environment 200 for facilitating contemporaneous in-browser searching, viewing, tagging, and harvesting of digital content on the Internet or other networked environments in accordance with embodiments of the present disclosure. The environment 200 includes user computing devices 210-211, remote computing system 220-223, and a communications network 290.

As shown in FIG. 2, the user computing device 210 includes the web browser 110 and the browser extension 120. The user computing device 211 includes a client-side application 215 configured to interface with the remote computing system 220 to create a virtual desktop 230 for the user computing device 211 at the remote computing system 220. The remote computing system 220 can include one or more servers 231 that are configured to implement the virtual desktop 230 and include the web browser 110 and the browser extension 120 such that the one or more servers 231 execute the web browser 110 and the browser extension 120 on behalf of the user computing device 211 and in response to instructions received from the user computing device 211 and as if the web browser 110 and browser extension 120 are being executed at the user computing device 211.

The remote computing systems 221-222 can include one or more servers 240 and 250, respectively, configured to host digital content. For example, the one or more servers 240 and 250 can be implemented as webservers that are configured to host websites 241 and 251, respectively, where the websites 241 and 251 each include webpages 242 and 252, respectively. The web browser 110 implemented by the user computing device 210 and the remote computing system 220 can be configured to navigate to the websites 241 and 251 hosted by the servers 240 and 250, respectively.

The remote computing system 223 can include one or more servers 260 configured to implement the portal 140 and can include the one or more databases 160. Those skilled in the art will recognize that the databases 160 can be incorporated into one or more of the servers 260 such that one or more of the servers 260 can include the databases 160. In some embodiments, the one or more servers 260 executing the portal 140 can interact with the servers 250 and 260 of the remote computing systems 221-222, respectively, to access and retrieve webpages to be processed by the portal.

The communications network 290 can be any network over which information can be transmitted between devices communicatively coupled to the network. For example, the communication network 290 can be the Internet, an Intranet, virtual private network (VPN), wide area network (WAN), local area network (LAN), and the like.

In an exemplary operation, when an instance of the web browser 110 is launched by the user computing device 210 and/or the one or more servers 231, the web browser 110 load an instance of the browser extension 120 such that the user interface 122 and the background processes are executed in conjunction with the web browser 110 by the user computing device 210 and/or the one or more servers 231. The browser extension 120 requests (e.g., via the one or more graphical interfaces 124) user credentials from a user of the web browser 110. Upon receipt of the user credentials, the background processes 126 of the browser extension can be executed by the user computing device 210 and/or the one or more servers 231 to attempt to establish a connection with the remote computing system 223 by transmitting a message to the remote computing system 223 including the user credentials. The one or more servers 260 can execute the portal 140 to authenticate the user credentials, and the one or more servers 260 can transmits a message back to the browser extension 120 in response on operation of the portal 140 to indicate that a connection has been established between the user computing device 210 or the one or more servers 231 and the one or more servers 260.

Subsequently, the web browser 110 can navigate to a webpage 102 having an associated URL by querying of the servers of the remote computing system 221 or 222 based on the URL. The queried server can return a webpage to the user computing system 211 and/or the one or more servers 231 executing the web browser 110, which can render the webpage in the a browser window of the web browser 110. In response to the web browser 110 navigating to the webpage 102, the background processes 126 of the browser extension 120 incorporates the URL of the webpage into a message, and transmits the message to the one or more servers 260 for processing by the portal 140, which create one or more database queries based on the message. The one or more database queries can be structured to search a database for records associated with the URL received in the message that are specific to the user identifier and/or account identifier associated with the established connection between the user computing device 210 and the one or more servers 260 and/or between the one or more servers 231 and the one or more servers 260 (e.g., the database queries can be configured to search for a record correspond to the URL in a set of records associated with the user of the web browser 110 and browser extension 120).

The results of the one or more queries can be transmitted back to device(s) executing the web browser 110 by the one or more servers 260 for processing by the background processes 126 of the browser extension 120 as described herein.

In some instances, the URL to which the web browser 110 navigates can include links to the other webpages embedded in the webpage corresponding to the URL. For webpages that include embedded links corresponding to additional URLs, exemplary embodiments of the browser extension 120 can be executed by the user computing device 210 and/or the one or more servers 231 to extract the URLs associated with the links from the source code of the webpage and can include the URLs in a message to the one or more servers 260 for processing by the portal 140, which can generate one or more database queries based on the URLs.

The results of the one or more database queries can be transmitted back to the device(s) executing the web browser by the one or more servers 260 for processing by the browser extension 120 as described herein.

Figure 3:
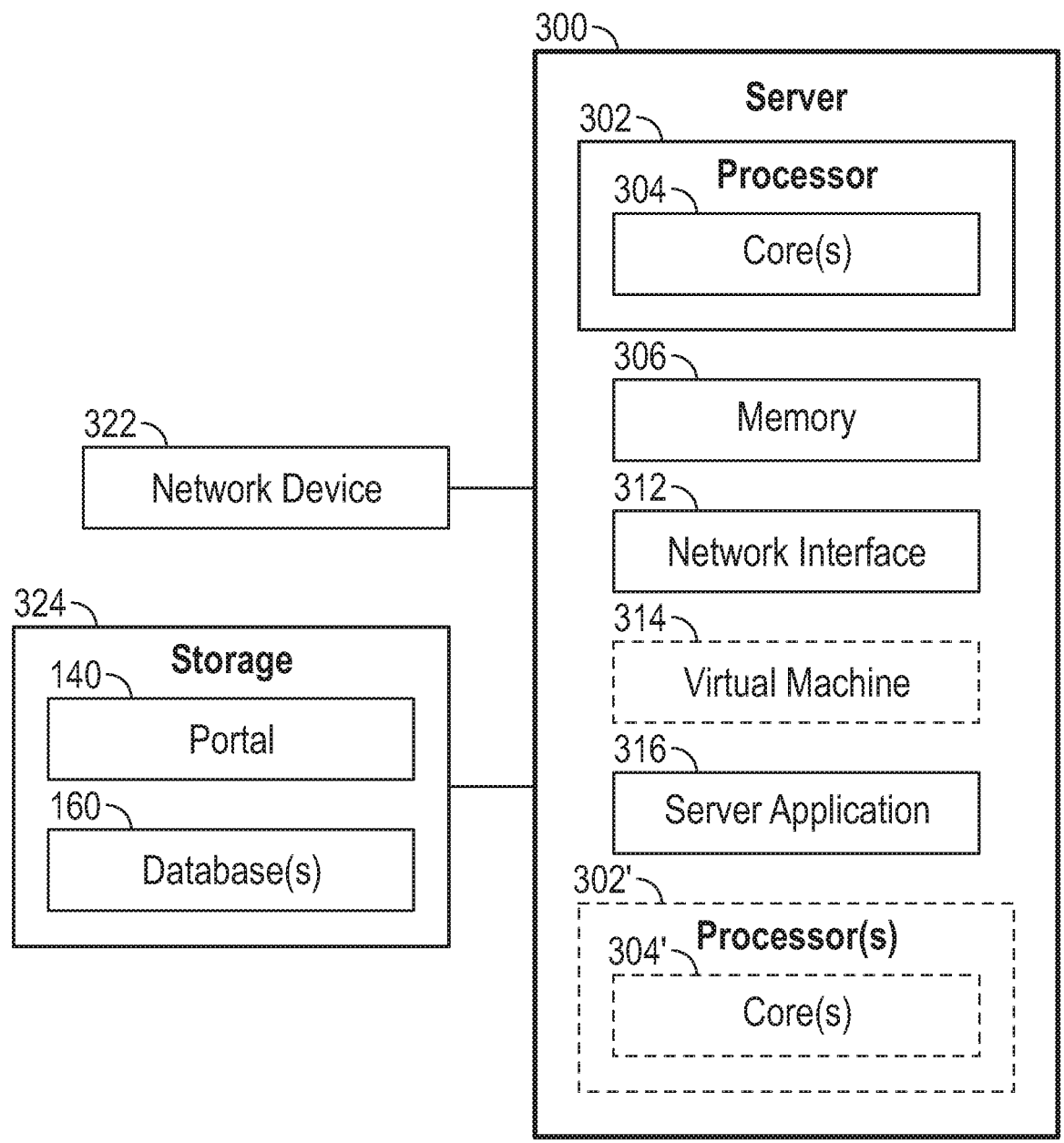
FIG. 3 is a block diagram of an exemplary server in accordance with embodiments of the present disclosure.

FIG. 3 is a block diagram of an exemplary server 300 in accordance with embodiments of the present disclosure. In the present embodiment, the server 300 is programmed and/or configured to execute one of more of the operations and/or functions of the portal 140. The server 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the server 300 may store computer-readable and computer-executable instructions or software for implementing exemplary embodiments of the portal 140 or portions thereof.

The server 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the server 300 so that infrastructure and resources in the computing device may be shared dynamically. One or more virtual machines 314 may be provided to handle a process running on multiple processors so that the process appears to be using only one computing resource rather than multiple computing resources, and/or to allocate computing resources to perform functions and operations associated with the portal 140. Multiple virtual machines may also be used with one processor or can be distributed across several processors.

Memory 306 may include a computer system memory or random access memory, such as DRAM, SRAM, EDO RAM, and the like. Memory 306 may include other types of memory as well, or combinations thereof.

The server 300 may also include one or more storage devices 324, such as a hard-drive, CD-ROM, mass storage flash drive, or other computer readable media, for storing data and computer-readable instructions and/or software that can be executed by the processing device 302 to implement exemplary embodiments of the portal 140 described herein.

The server 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the server 300 to any type of network capable of communication and performing the operations described herein. While the server 300 depicted in FIG. 3 is implemented as a server, exemplary embodiments of the server 300 can be any computer system, such as a workstation, desktop computer or other form of computing or telecommunications device that is capable of communication with other devices either by wireless communication or wired communication and that has sufficient processor power and memory capacity to perform the operations described herein.

The server 300 may run any server application 316, such as any of the versions of server applications including any Unix-based server applications, Linux-based server application, any proprietary server applications, or any other server applications capable of running on the server 300 and performing the operations described herein. An example of a server application that can run on the computing device includes the Apache server application.

Figure 4:
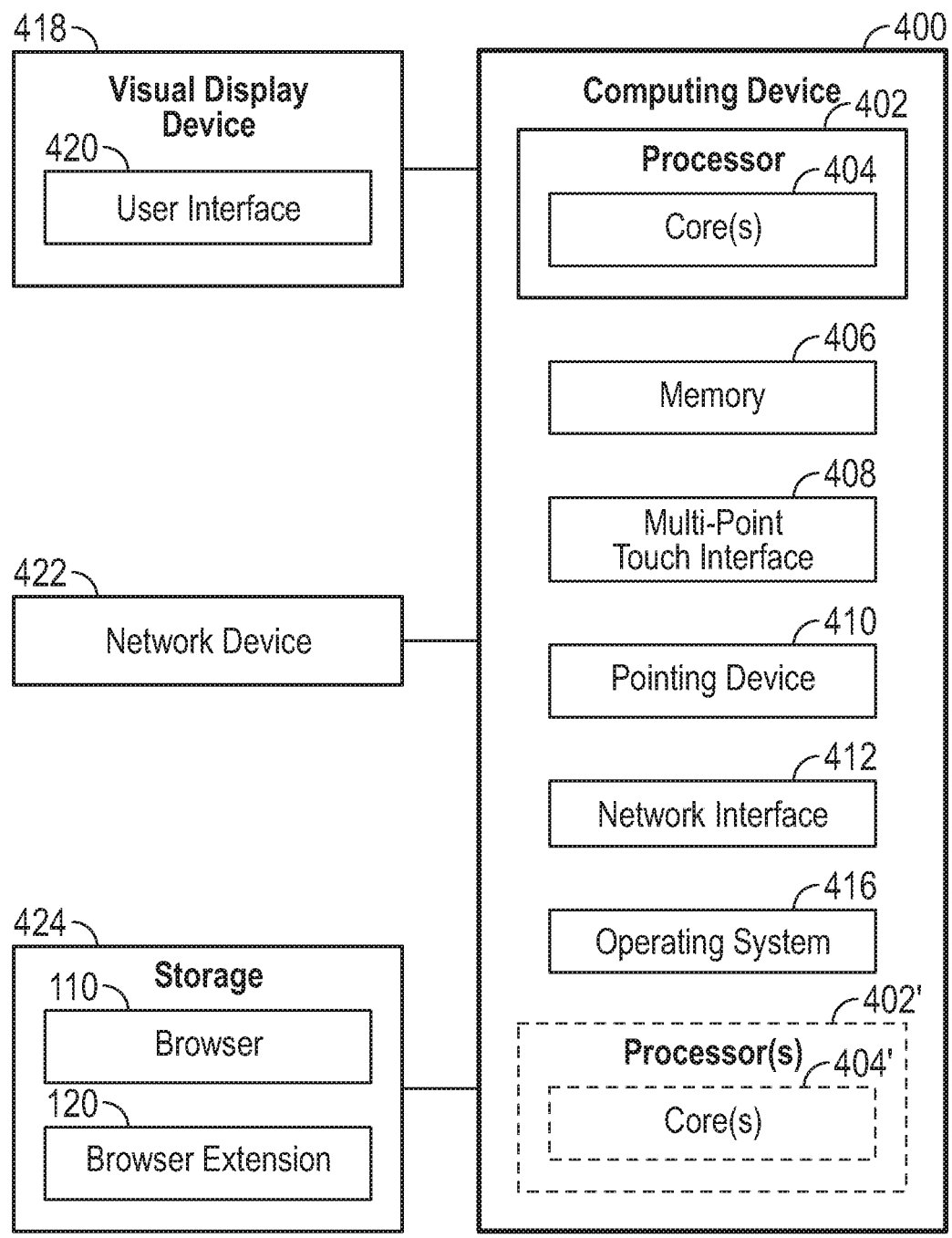
FIG. 4 is a block diagram of an exemplary computing device in accordance with embodiments of the present disclosure.

FIG. 4 is a block diagram of an exemplary user computing device 400 that may be used to implement exemplary embodiments of the web browser 110 and the browser extension 120. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the web browser 110 and the browser extension 120. The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418, such as a computer monitor, which may display one or more user interfaces 420 that may be provided in accordance with exemplary embodiments. The computing device 400 may include other I/O devices for receiving input from a user, for example, a keyboard or any suitable multi-point touch interface (e.g., keyboard) 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the engine 100 described herein. Exemplary storage device 424 may also store information required to implement exemplary embodiments. For example, exemplary storage device 424 can store information, such as a browser history and/or one or more files created by the browser extension to facilitate communication between the browser extension 120 and the portal 140.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 5:
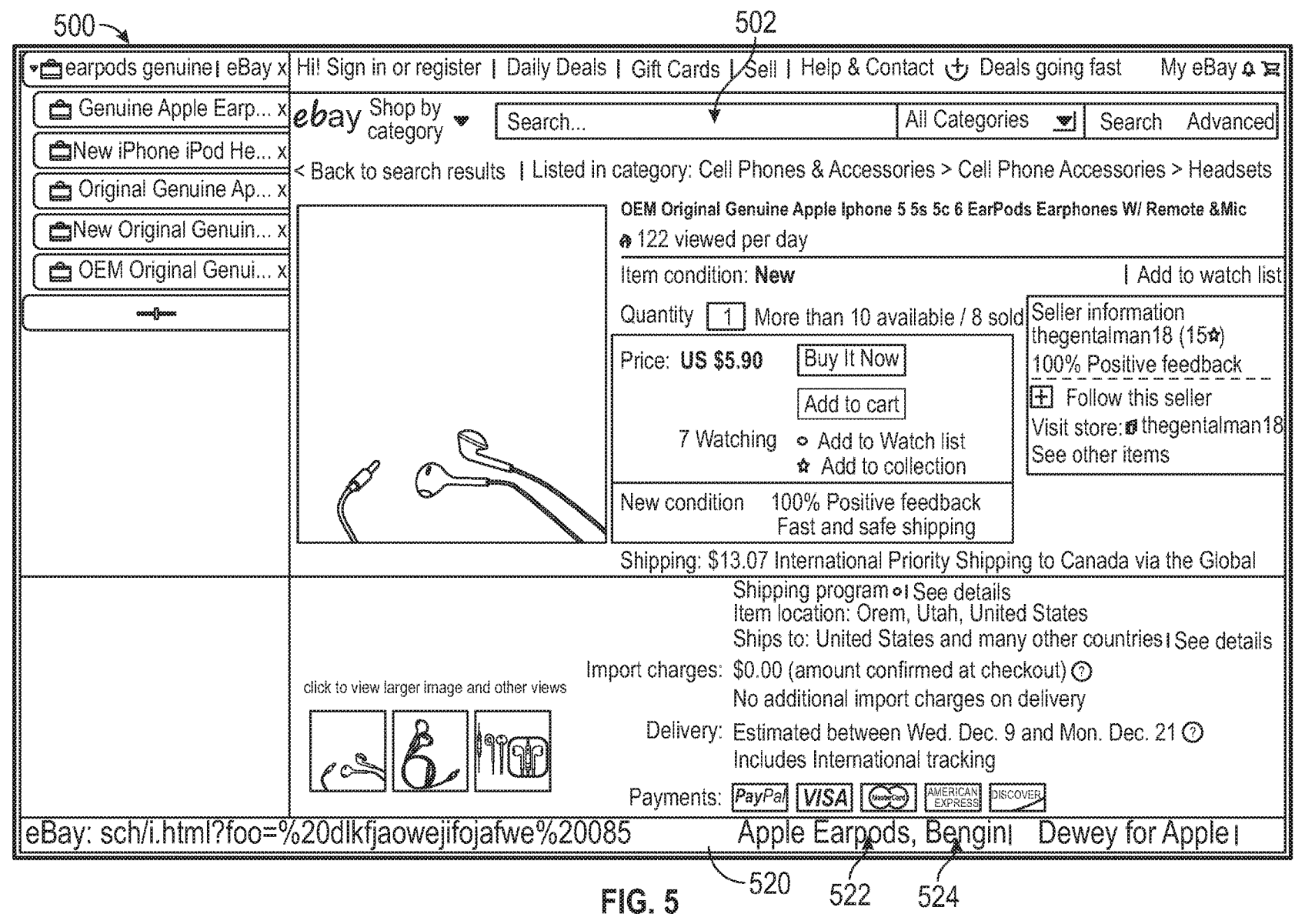

FIG. 5 depicts a webpage 502 opened in a browser window 500 of a web browser (e.g., an embodiment of the web browser 110). Upon launching the web browser, the web browser can call a browser extension (e.g., an embodiment of the browser extension 120), which can be implemented to facilitate contemporaneous in-browser searching, viewing, tagging, and harvesting of digital content in accordance with embodiments of the present disclosure. A graphical user interface 520 of the browser extension can be disposed to overlay a portion of a webpage being displayed by the web browser or can be embedded in a frame of the browser window 500. For example, in the present example, the graphical user interface 520 of the browser extension is shown in a minimized form along a bottom of the browser window 500.

In its minimized form, the graphical user interface 500 of the browser extension can include information retrieved by the browser extension from a database via a portal (e.g., the database 160 and portal 140). The information can include, for example, tags 522 associated with the URL of the webpage 502 that were previously specified. For example, a benign tag 524 was previously specified for the content of the webpage 502 associated with the URL. In exemplary embodiments, in its minimized form, the graphical user interface 520 of the browser extension can be color coded to indicate that the benign tag has been assigned to the webpage associated with the URL and/or can include other indicators. For example, the graphical user can be green to indicate that the content of the webpage 502 was previously found to be benign. While the minimized form of the graphical user interface 502 of the browser extension is shown as extending across a bottom edge of the browser window 500, a position of the minimized form of the graphical user interface 502 of the browser extension can be disposed in other positions in the browser window 500 and/or may not be displayed in the browser window 500 when it is in the minimized form.

Figure 6A:
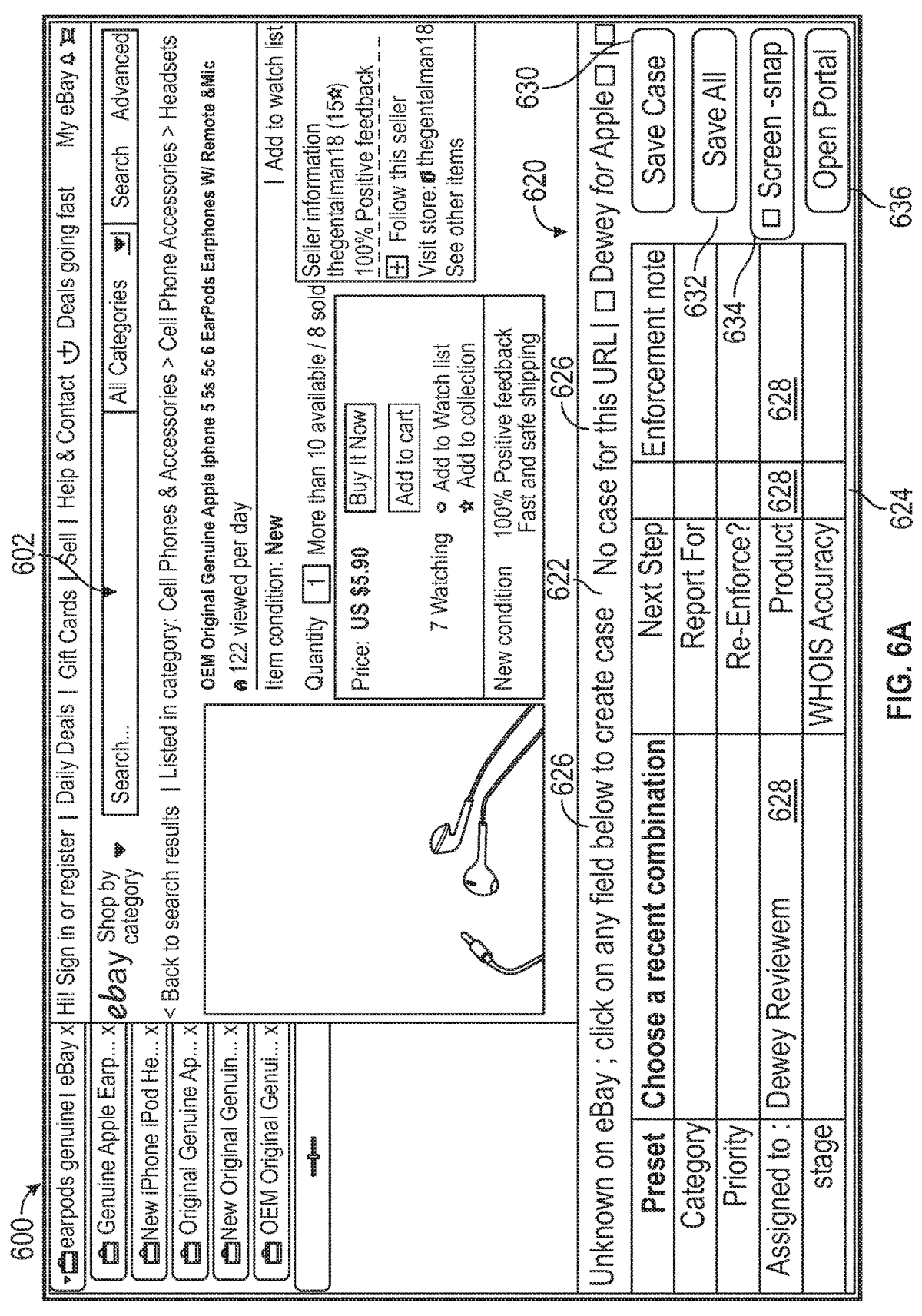
Figure 6B:
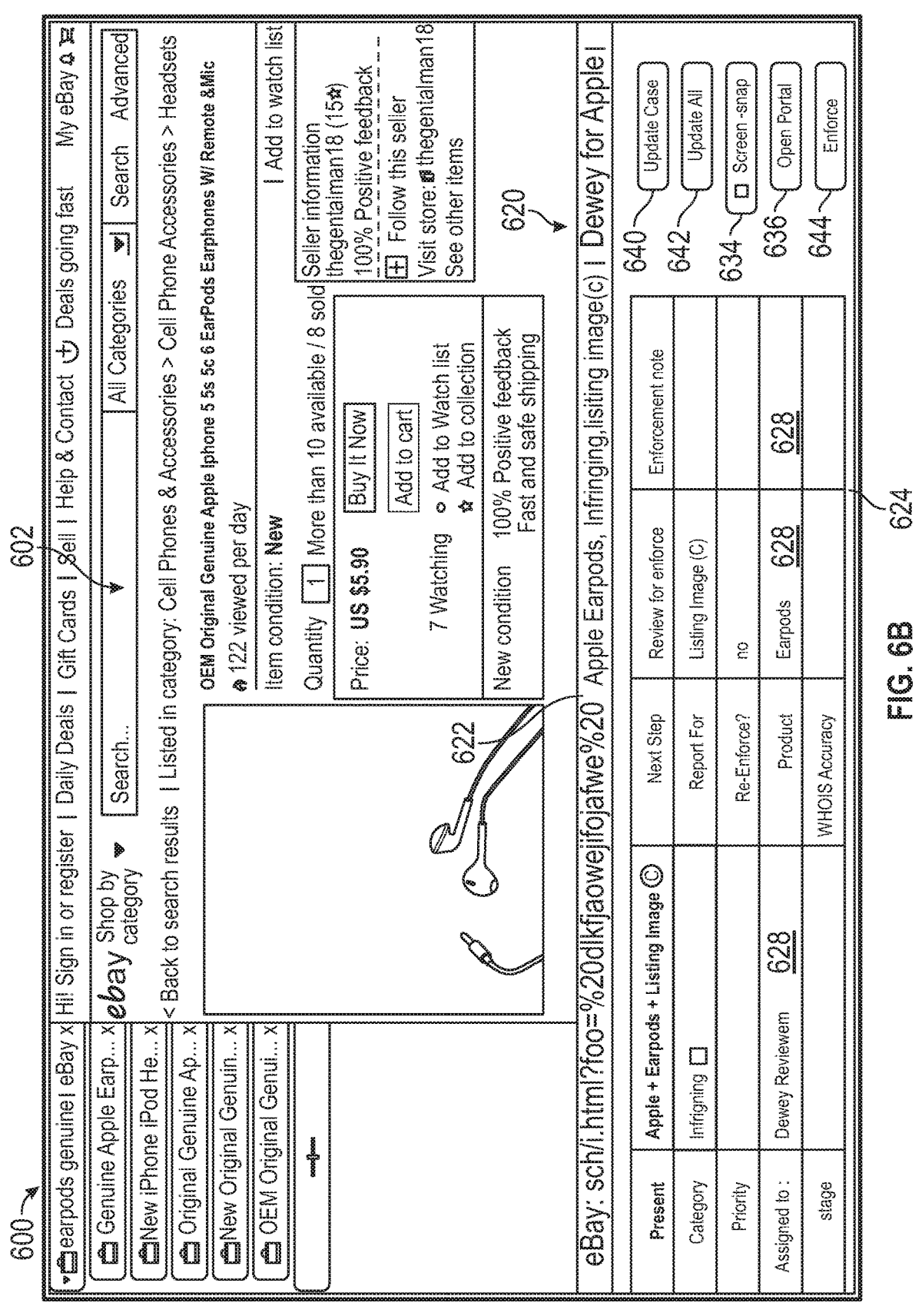

FIGS. 6A and 6B depict a webpage 602 opened in a browser window 600 of a web browser and a graphical user interface 620 of an embodiment of the browser extension in a maximized position. FIG. 6A shows the graphical user interface 620 before a record for the URL is created in the database by the portal. FIG. 6B shows the graphical user interface after the user specifies tags for the URL associated with the webpage 602.

The graphical user interface 620 of the browser extension can be disposed to overlay a portion of the webpage 602 being displayed by the web browser or can be embedded in a frame of the browser window 600. For example, in the present example, the graphical user interface 620 of the browser extension is shown in a maximized form along a bottom of the browser window 600. In its maximized form, the graphical user interface 620 of the browser extension can include a status bar 622 that can include information about whether the URL associated with the webpage 602 has been previously harvested and/or tagged. The graphical user interface 620 can also include a tagging area 624 within which the user can specify one or more tags for the webpage 602.

Referring to FIG. 6A, the browser extension in conjunction with the portal can determine that the URL associated with the webpage 602 has not previously been harvested and/or tagged. In response, the status bar 622 of the graphical user interface 620 can be color coded (e.g., as yellow) to indicate that the URL associated with the webpage 602 has not previously been harvested and/or tagged and/or can insert information 626 into the status to further indicate that the URL associated with the webpage 602 has not previously been harvested and/or tagged. The tagging area 624 of the graphical user interface 620 can include empty tag fields 628.

As shown in FIG. 6A, the graphical user interface 620 of the browser extension can include one or more buttons that can be selected by a user to perform one or more actions. As one example, a user can select the "Save Case" button 630 to trigger a harvesting of the webpage and any tags that were input by the user. The harvesting can cause the browser extension to send one or more messages to the portal to create a record for the URL associated with the webpage, and to store in the record, attributes extracted from the webpage as well as any tags specified by the user via the graphical user interface 620. As another example, the user can select a "Save All" button 632 to trigger the harvesting of multiple webpages open in multiple browser windows or browser tabs. As another example, the user can select a "Screen-snap" button 634 in the graphical user interface 620 to capture an image of the webpage to be associated with a record for the URL in the database via the portal. As another example, the graphical user interface 620 can include an "Open Portal" button 636 that can be selected by the user to harvest the webpage and open an instance of the portal to view and tag the URL in the portal.

As shown in FIG. 6B, tags have been specified in the tag fields 628 in the tagging area 624 of the graphical user interface 620. For example, a tag field 650 associated with a content/category tag has been populated with the infringing tag to indicate that content on the webpage 602 is infringing. In response to populating the tagging fields and identifying the content of the webpage 602 as infringing, the status bar 622 can be color coded (e.g., as red) and can include information 626 further indicating the status of as infringing.

For URLs that have been harvested and/or tagged, the graphical user interface 620 of the browser extension can include one or more buttons that can be selected by a user to perform one or more actions. As one example, a user can select the "Update Case" button 640 to trigger a re-harvesting of the webpage and updating of any tags that were input by the user. The re-harvesting can cause the browser extension to send one or more messages to the portal to update a record for the URL associated with the webpage, and to store in the record, updated attributes extracted from the webpage as well as any updated tags specified by the user via the graphical user interface 620. As another example, the user can select an "Update All" button 642 to trigger the re-harvesting of multiple webpages open in multiple browser windows or browser tabs. As another example, the user can select an "Enforce" button 644 in the graphical user interface 620 to autonomous generate an enforcement package including attributes associated with the webpage 602, an image of the webpage (e.g., captured in response to selection of the Screen-snap button 634. The enforcement package can be transmitted from the browser extension to the portal and/or to the data source from which the webpage was retrieved to facilitate removal of the webpage due to the infringing (e.g., malignant) content included therein.

Figure 6C:
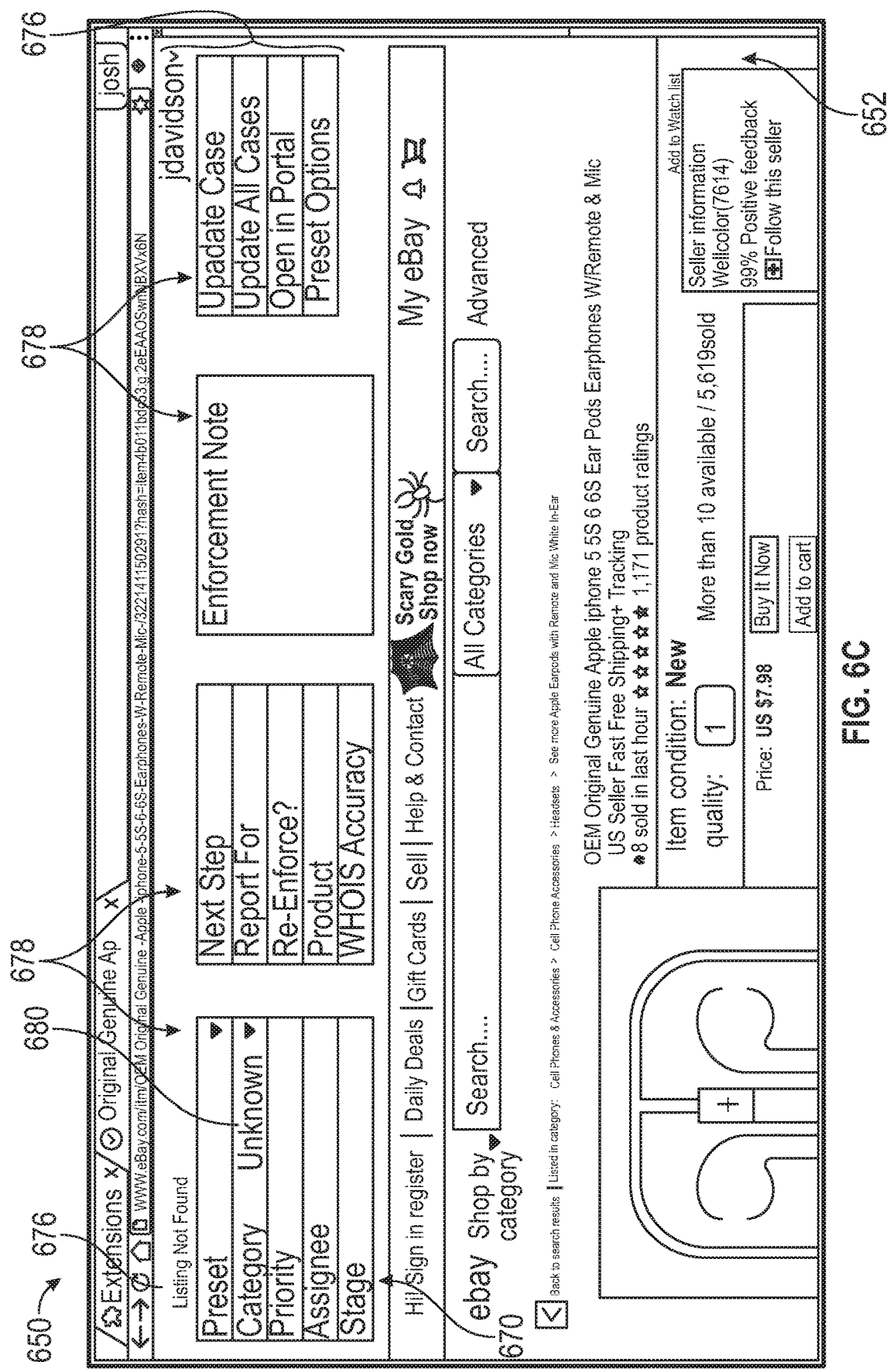

FIG. 6C depicts a webpage 652 opened in a browser window 650 of a web browser and a graphical user interface 670 of an embodiment of the browser extension in accordance with embodiments of the present disclosure. The browser extension in conjunction with the portal can determine that the URL associated with the webpage 652 has not previously been harvested and/or tagged. In response, the graphical user interface 670 can be color coded (e.g., as gray) to indicate that the URL associated with the webpage 652 has not previously been harvested and/or tagged, can set the category or content tag 680 to a default value (e.g., unknown), and/or can insert information 676 into the graphical user interface 670 to further indicate that the URL associated with the webpage 652 has not previously been harvested and/or tagged. The tagging area 674 of the graphical user interface 670 can include empty tag fields 678. The graphical user interface 670 of the browser extension can include the "Update Case" button 640, the "Update All" button 642, the "Open Portal" button 636, and a "Preset Option" button 690. The "Preset Option" button 690 allows users to create, update, and modify their own user defined sets of tags to be used, via a preset dropdown in the top right of the graphical user interface 670 in FIGS. 6C & 6D. For example, if users have a common sets of values for certain tags, the user can save each set of values via the dropdown menu and then at later time can select the button 690 to automatically populate the tagging area 674 of the graphical user interface 670 with the values of the tag specified in the sets of values, rather than manually populating the same values on a webpage basis.

Figure 6D:
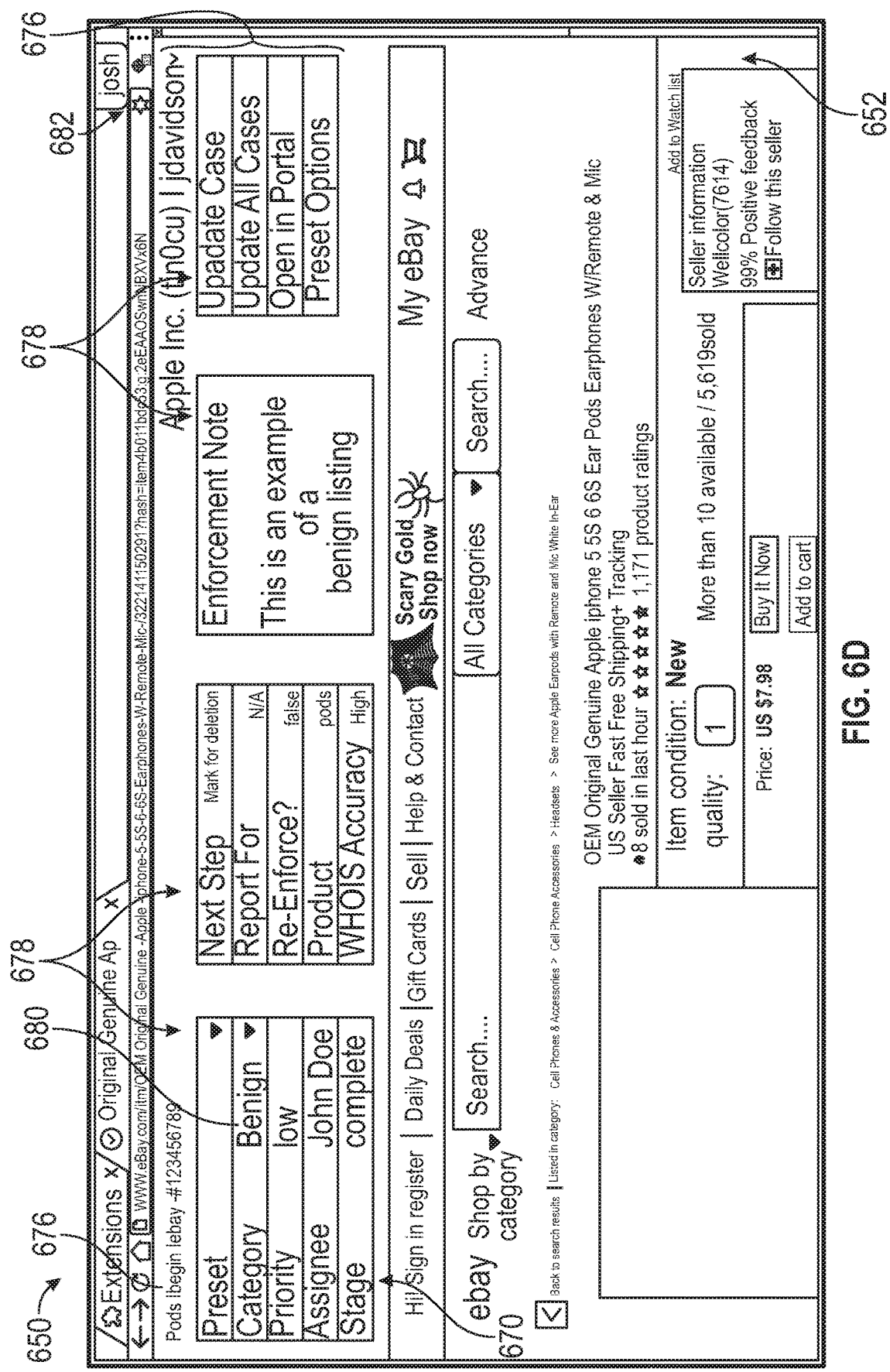

FIG. 6D shows the graphical user interface 670 of FIG. 6C after the URL associated with the webpage 652 rendered in the browser window 650 has been tagged (e.g., via the tagging area 624). As shown in FIG. 6 D, the value of the content or category tag 680 has been set to the benign. In response the URL being tagged as benign, the graphical user interface 670 can be color coded (e.g., as blue) to indicate that the URL associated with the webpage 652 has been tagged as benign and/or can insert information 676 into the graphical user interface 670 to further indicate that the URL associated with the webpage 652 has been tagged as benign. In some embodiments, additional information can be added to the graphical user interface and/or web browser to additional details about a URL that includes a content or category tag value other than "unknown". In exemplary embodiments, in response to determine a webpage was previously harvested and/or tagged such that a record in the attribute database is exists or is created, the browser extension can indicate, for example, a number of days that have elapsed since the webpage associated with the URL was harvested and/or tagged. For example, as shown in FIG. 6D, the browser extension can modify an extension badge icon 682 to display number of days that have elapsed since the webpage associated with the URL was harvested and/or tagged (e.g., determined based on the last time the corresponding record in the attribute database was updates). Due to the fluid nature of content on the Internet, content of a webpage can be easily modified at any time. The indicator identifying the last time a webpage associated with a URL was harvested and/or tagged can be used to determine whether the webpage should be re-harvested and/or re-tagged.

Figure 7:
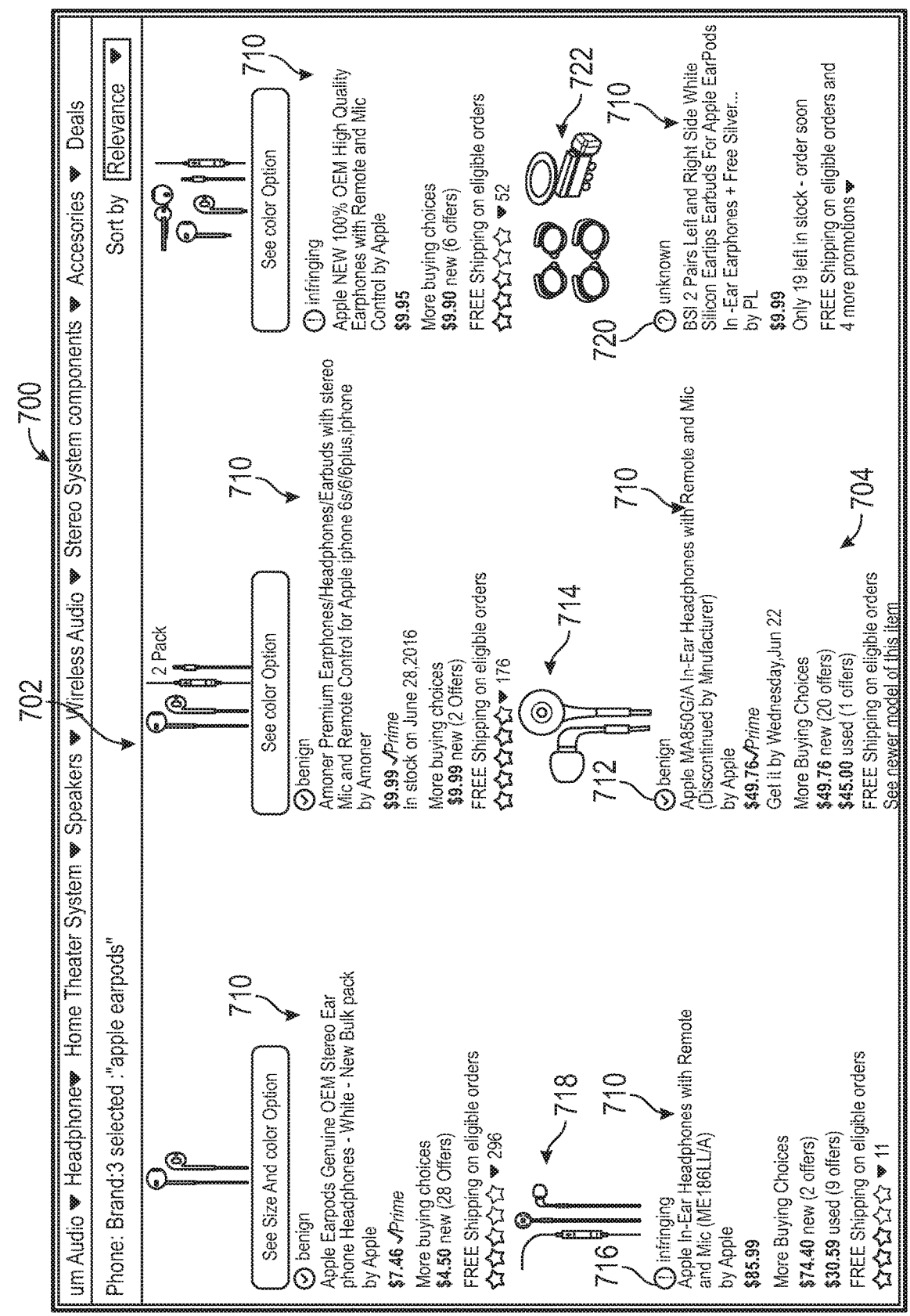

FIG. 7 depicts a webpage 702 opened in a browser window 700 of a web browser (e.g., an embodiment of the web browser 110). Upon launching the web browser, the web browser can call a browser extension (e.g., an embodiment of the browser extension 120), which can be implemented to facilitate contemporaneous in-browser searching, viewing, tagging, and harvesting of digital content in accordance with embodiments of the present disclosure. In the present example, the webpage 702 can include search results 704 returned by a search engine in response to submission of a search string 706 to the search engine, e.g., via a search field 708, of an online marketplace website. The search results 704 can be arranged as tiles in a grid format. Each of the search results 704 can include a link 710 associated with a URL to another webpage for the search result.

In exemplary embodiments, when the web browser navigates to the webpage 702, exemplary embodiments of the browser extension can extract the URLs associated with each of the links 710 in the search results, and can send one or more messages to the portal to determine whether the URLs associated with the links 710 have been previously harvested and tagged. The portal can query the databases and can return the results of the query to the browser extension. Based on the results from the portal, the browser extension can insert an indicator into the webpage 702 for each of the links 710 to indicate whether the URL corresponding to the link has previously been tagged, and if so, with what category or content tag. To insert the indicators, the browser extension can modify the in-memory version of the source code for the webpage 702 (e.g., as stored by the device executing the web browser) to include the indicators. For example, the browser extension can insert an indicator 712 in the webpage 702 in proximity to the link for a result 714 to indicate that the URL associated with the link corresponds to benign content, can insert an indicator 716 in the webpage 702 in proximity to the link for a result 718 to indicate that the URL associated with the link corresponds to infringing content, and/or can insert an indicator 720 in the webpage 702 in proximity to the link for a result 722 to indicate that the URL associated with the link has not been previously tagged.

Figure 8:
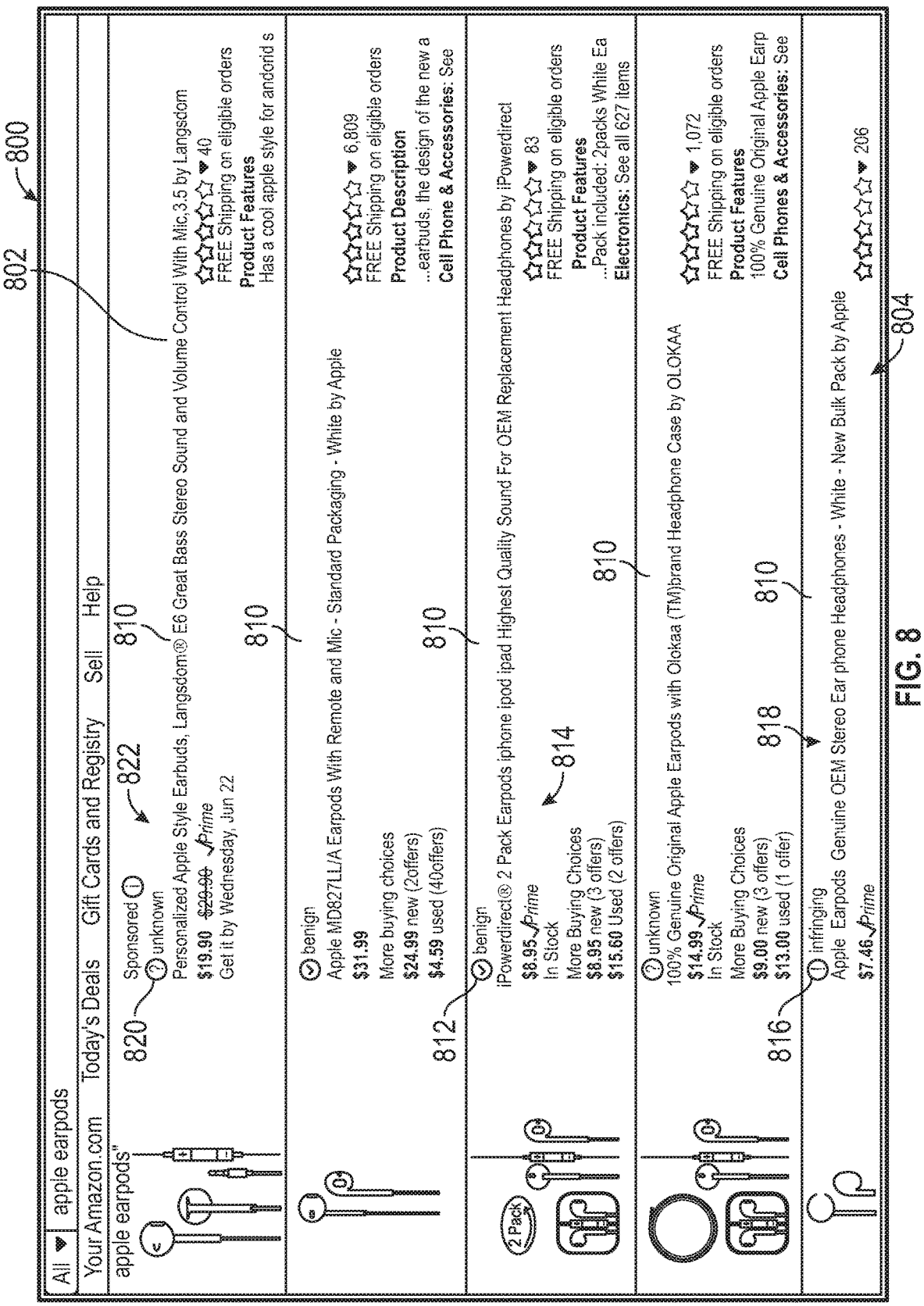

FIG. 8 depicts a webpage 802 opened in a browser window 800 of a web browser (e.g., an embodiment of the web browser 110). Upon launching the web browser, the web browser can call a browser extension (e.g., an embodiment of the browser extension 120), which can be implemented to facilitate contemporaneous in-browser searching, viewing, tagging, and harvesting of digital content in accordance with embodiments of the present disclosure. In the present example, the webpage 802 can include search results 804 returned by a search engine in response to submission of a search string 806 to the search engine, e.g., via a search field 808, of an online marketplace website. The search results 804 can be arranged in a list format. Each of the search results 804 can include a link 810 associated with a URL to another webpage for the search result.

In exemplary embodiments, when the web browser navigates to the webpage 802, exemplary embodiments of the browser extension can extract the URLs associated with each of the links 810 in the search results, and can send one or more messages to the portal to determine whether the URLs associated with the links 810 have been previously harvested and tagged. Based on the results from the portal, the browser extension can insert an indicator into the webpage 802 for each of the links 810 to indicate whether the URL corresponding to the link has previously been tagged and if so, with what category or content tag. For example, the browser extension can insert an indicator 812 in the webpage 802 in proximity to the link for a result 814 to indicate that the URL associated with the link corresponds to benign content, can insert an indicator 816 in the webpage 802 in proximity to the link for a result 818 to indicate that the URL associated with the link corresponds to infringing content, and/or can insert an indicator 820 in the webpage 802 in proximity to the link for a result 822 to indicate that the URL associated with the link has not been previously tagged.

Figure 9:
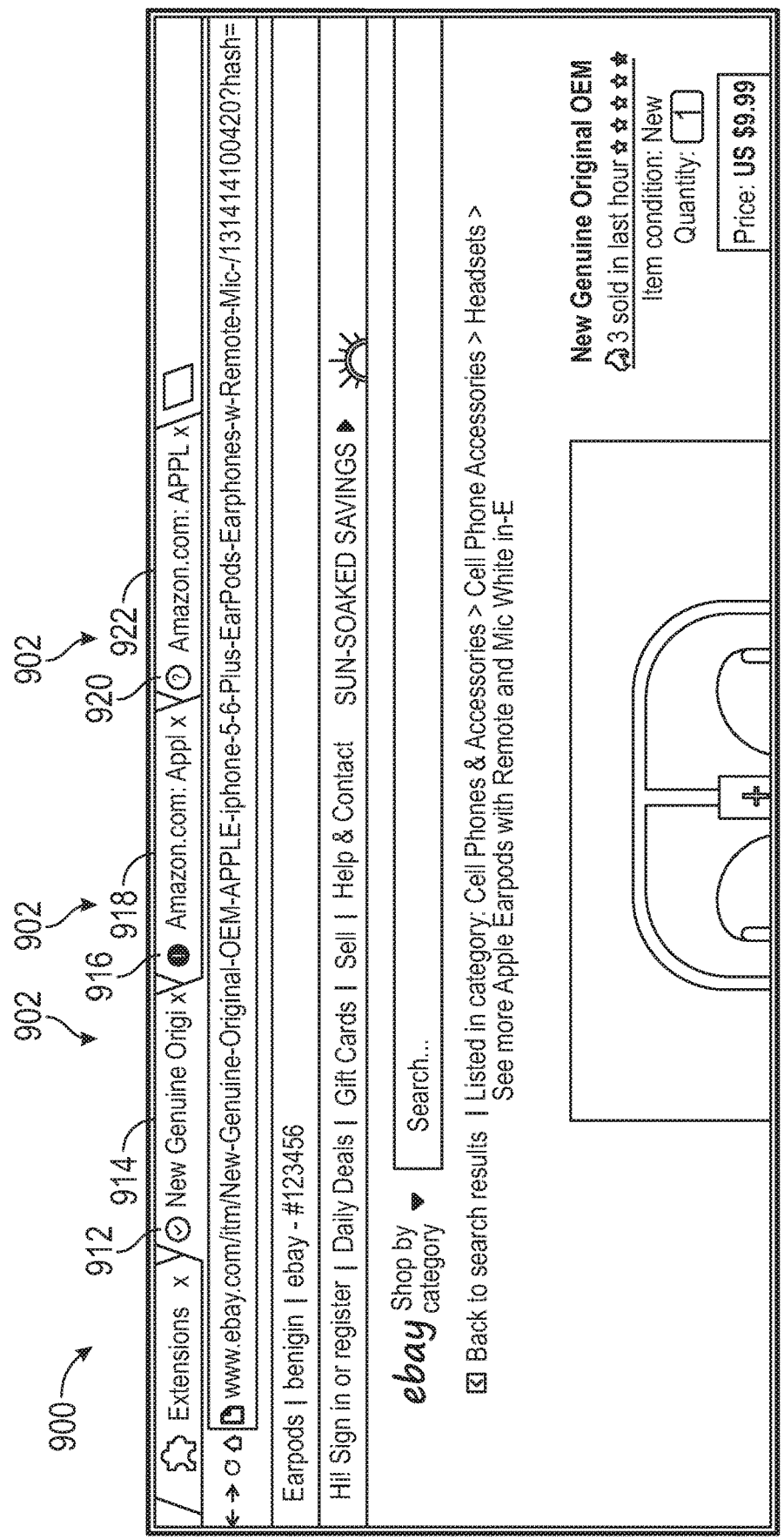

FIG. 9 depicts a browser window 900 of a web browser (e.g., an embodiment of the web browser 110) that includes multiple browser tabs 902, where each browser tab is associated with a webpage that can be displayed by the web browser in response to selection of a corresponding browser tab. Upon launching the web browser, the web browser can call a browser extension (e.g., an embodiment of the browser extension 120), which can be implemented to facilitate contemporaneous in-browser searching, viewing, tagging, and harvesting of digital content in accordance with embodiments of the present disclosure. The browser tabs 902 can be associated with a URLs for the webpages that can be displayed by the browser tabs 902.

In exemplary embodiments, when each of the browser tabs 902 is open, exemplary embodiments of the browser extension can extract the URLs associated with each of the browser tabs, and can send one or more messages to the portal to determine whether the URLs associated with the browser tabs 902 have been previously harvested and tagged. Based on the results from the portal, the browser extension can insert an indicator into the each of the browser tabs 902 to indicate whether the URL corresponding to each browser tab has previously been tagged and if so, with what category or content tag. To insert the indicators, the browser extension can modify the in-memory version of the source code for the webpages associated with the browser tabs 902 (e.g., as stored by the device executing the web browser) to include the indicators. For example, the browser extension can insert an indicator 912 into a browser tab 914 to indicate that the URL associated with the browser tab 914 corresponds to benign content, can insert an indicator 916 into a browser tab 918 to indicate that the URL associated with the browser tab 918 corresponds to infringing content, and/or can insert an indicator 920 into a browser tab 922 to indicate that the URL associated with the browser tab 922 has not been previously tagged.

Figure 10:
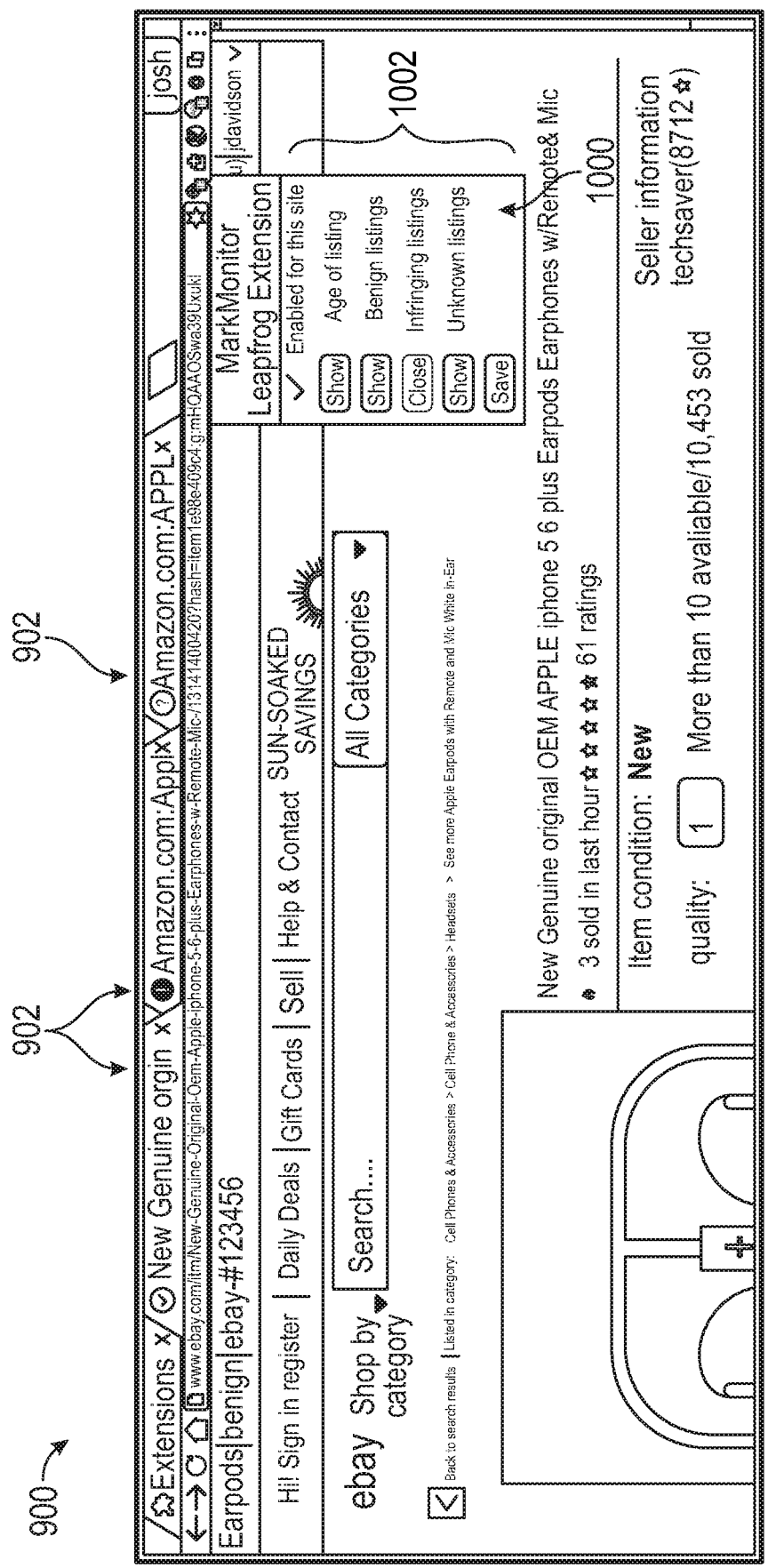

FIG. 10 depicts a browser window 900 of a web browser (e.g., an embodiment of the web browser 110) that includes multiple browser tabs 902, and depicts a graphical user interface 1000 of the browser extension that allows the user to show and/or close one or more of the browser tabs 902 based on the values of the category or content tags specified for the URLs associated with the webpages that can be displayed by the browser tabs 902. For example, the graphical user interface 1000 can include options 1002 to a show or hide the browser tabs 902 corresponding to URLs that have been tagged as benign, infringing, and/or unknown, and can be include options 1002 to show or hide the browser tabs 902 based on an age of the webpages being rendered by the browser tabs 902.

Figure 11:
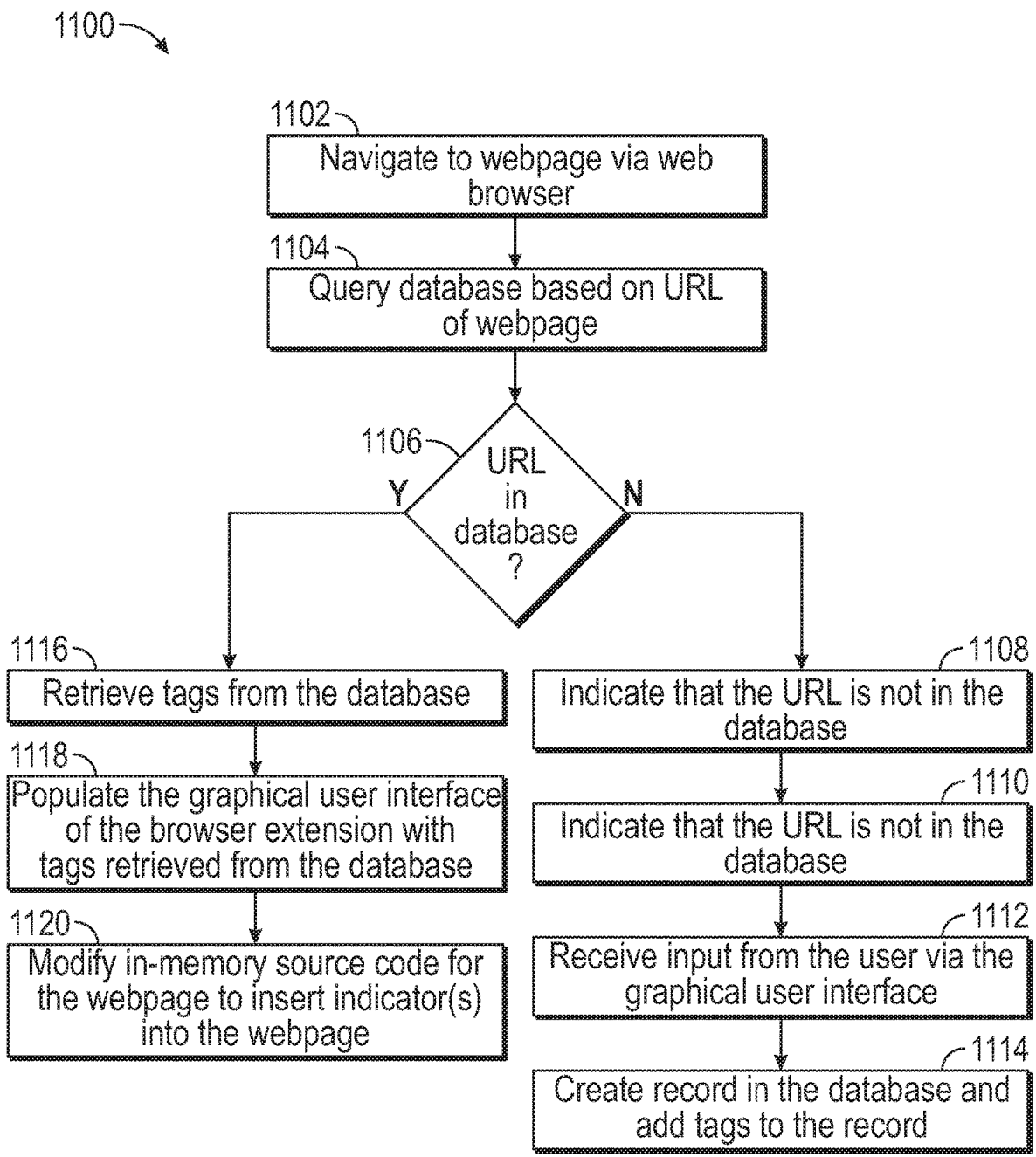
FIG. 11 is a flowchart illustrating an exemplary process for contemporaneously searching, viewing, tagging, and harvesting content in a networked environment.

FIG. 11 is a flowchart illustrating an exemplary process 1100 for contemporaneously searching, viewing, tagging, and harvesting content in a networked environment. At step 1102, a web browser can be executed by a computing device (e.g., a user computing device and/or server) to navigate to and display a webpage. For example, the web browser can navigate to the webpage by querying a webserver hosting the webpage based on a URL associated with the webpage to retrieve webpage and display the web page in a window of the browser. In response to navigation to the webpage, at step 1104, an embodiment of the browser extension can be executed to query a database in an embodiment of the portal based on a URL associated with the webpage.

At step 1106, the portal can determine whether the URL is included in the database. If not, the process 1100 proceeds to step 1108, at which the portal transmits a message to the browser extension indicating that the URL is not in the database. At step 1110, the browser extension provides an indication to the user that the URL is not in the database (e.g., via a graphical user interface of the browser extension. At step 1112, the browser extension can receive input from the user via the graphical user interface, which can include populating one of more data entry fields with tags associated with the webpage being displayed. At step 1114, in response to selection of an option in the graphical user interface to harvest the webpage, the browser extension can transmit the URL and tags to the portal with instructions to create a record in the database for the URL and to include the tags in the record.

Referring back to step 1106, if the URL is in the database, at step 1116, the portal can retrieve the record associated with the URL from the database and can transmit the tags in the record to the browser extension. At step 1118, the browser extension can populate the graphical user interface of the browser extension with the tags, and at step 1120, the browser extension can modify an in-memory version of the source code for the webpage to insert one or more indicators into the webpage.

Figure 12:
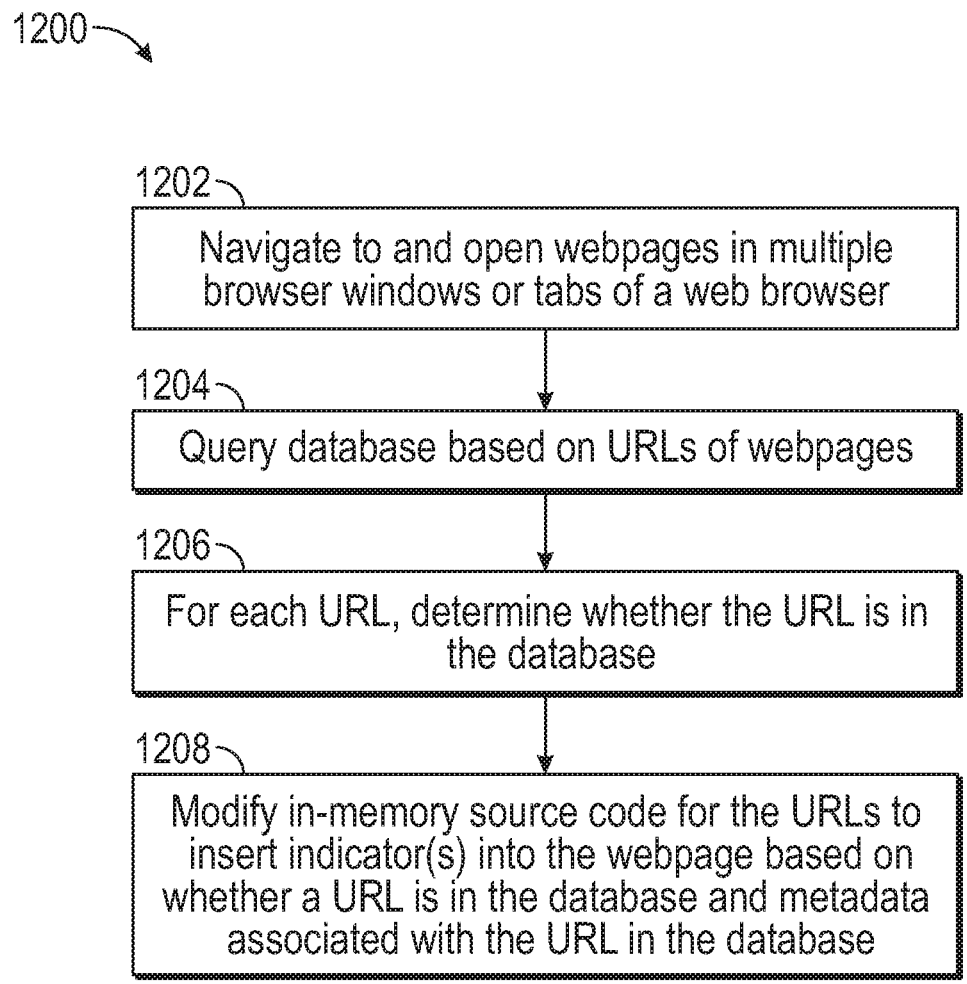
FIG. 12 is a flowchart illustrating an exemplary process for contemporaneously inserting indicators into multiple webpages via a web browser in accordance with embodiments of the present disclosure.

FIG. 12 is a flowchart illustrating an exemplary process 1200 for contemporaneously inserting indicators into multiple webpages via a web browser. At step 1202, an embodiment of the browser extension can be executed with the web browser to navigate to and open multiple webpages in multiple browser windows or tabs. For example, the browser extension can use a bulk URL opener to open a set of URLs in a web browser, where each URL can be open in a different browser window and/or a different browser tab. The web browser can navigate to the webpages by querying one or more webservers hosting the webpages based on the URLs associated with the webpages to retrieve and display the webpages in the browser windows or tabs. At step 1204, in response to navigating to the webpages in the browser windows or tabs, the browser extension can be executed to query a database in an embodiment of the portal based on the URLs associated with the webpages.

At step 1206, for each webpage, the portal can query the database to determine whether each URL is in the database and can return results for each URL (e.g., including whether a record exists and/or one or more tags associated with the URLs), and at step 1208, the browser extension can be executed to modify the source code of the URLs to insert indicators into the webpages based on whether each URL is in the database and tags associated with each URL in the database.

Figure 13:
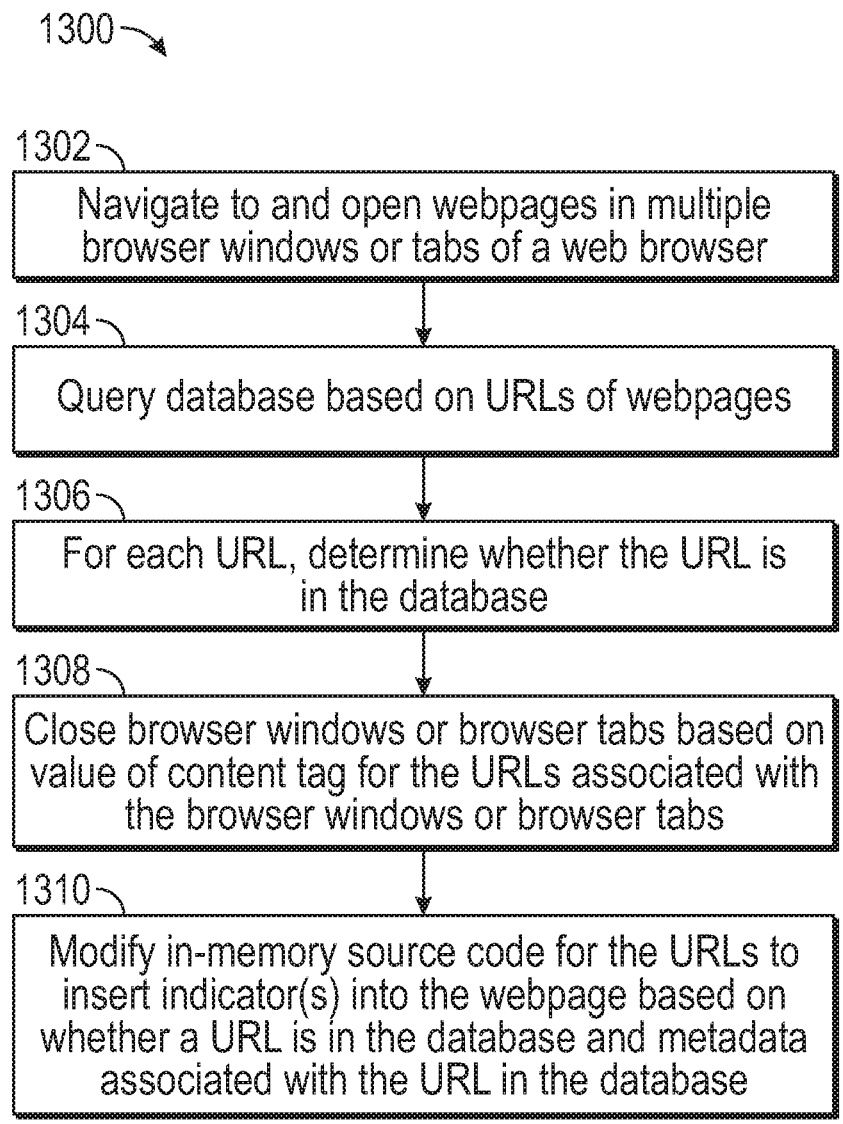
FIG. 13 is a flowchart illustrating an exemplary process for contemporaneously controlling the opening and closing of browser windows or browser tabs associated with webpages based on one or more tags associated with the URLs of the webpages in accordance with embodiments of the present disclosure.

FIG. 13 is a flowchart illustrating an exemplary process 1300 for contemporaneously controlling the opening and closing of browser windows or browser tabs associated with webpages based on one or more tags associated with the URLs of the webpages in accordance with embodiments of the present disclosure. At step 1302, an embodiment of the browser extension can be executed with the web browser to navigate to and open multiple webpages in multiple browser windows or tabs. For example, the browser extension can use a bulk URL opener to open a set of URLs in a web browser, where each URL can be open in a different browser window and/or a different browser tab. The web browser can navigate to the webpages by querying one or more webservers hosting the webpages based on the URLs associated with the webpages to retrieve and display the webpages in the browser windows or tabs. At step 1304, in response to navigating to the webpages in the browser windows or tabs, the browser extension can be executed to query a database in an embodiment of the portal based on the URLs associated with the webpages.

At step 1306, for each webpage, the portal can query the database to determine whether each URL is in the database and can return to results to the browser extension including whether a record exists and/or one or more tags associated with the URLs. At step 1308, as the browser extension receives the results for each URL, the browser extension can be configured to close one or more of the browser windows and/or browser tabs based on a value of the category or content tag (e.g., unknown, benign, infringing, counterfeit, malicious) associated with the URLs for the webpages being rendered in the browser windows or browser tabs. As one non-limiting example, the browser extension can be configured to automatically close a browser window and/or browser tab in response a URL associated with the webpage being rendered by the browser window and/or browser tab having a content tag with a benign tag value. As another non-limiting example, the user can specify which values of the content tag results in the closing of browser windows or browser tabs, e.g., using the graphical user interface shown in FIG. 10.

At step 1310, the browser extension can be executed to modify the source code of the URLs to insert indicators into the webpages of the browser windows or browser tabs that remain open based on whether each URL is in the database and tags associated with each URL in the database.

Figure 14:
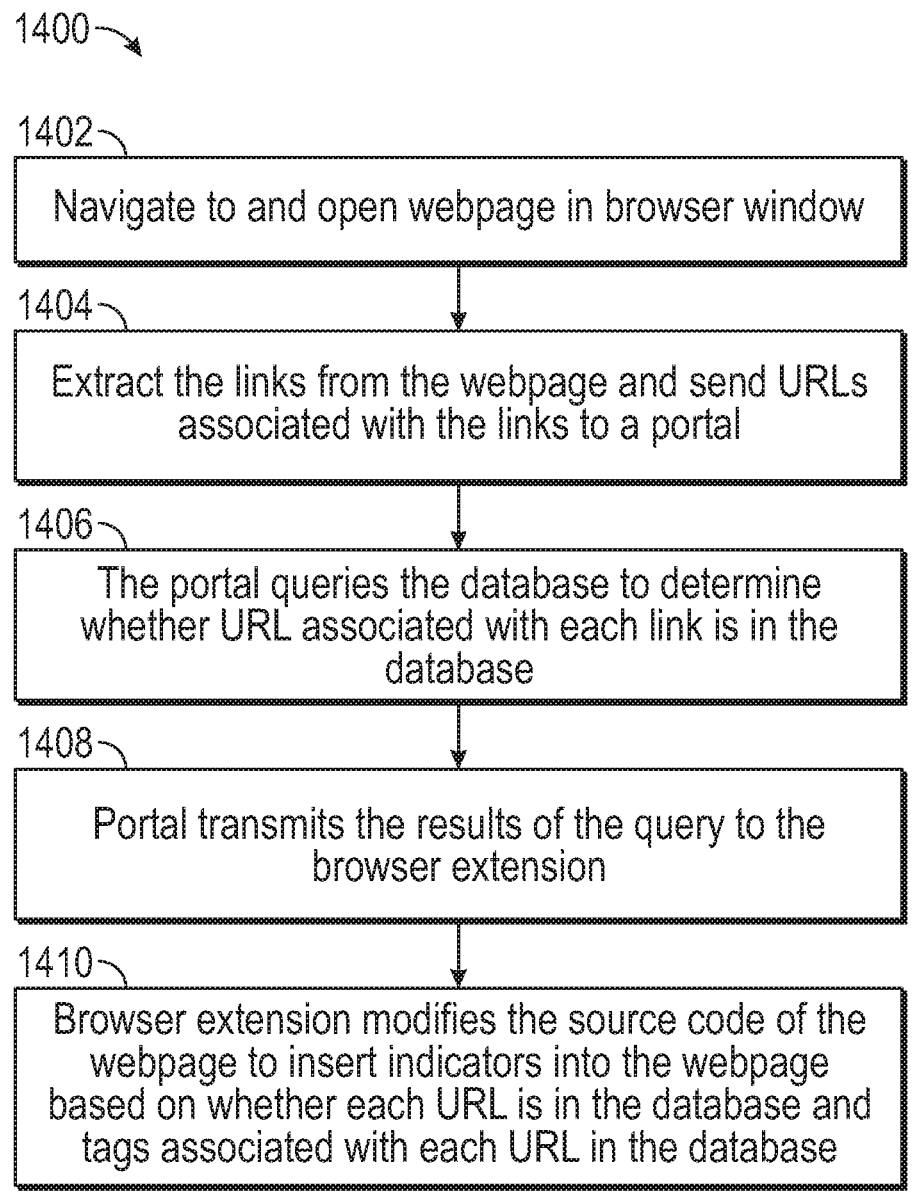
FIG. 14 is a flowchart illustrating an exemplary process for contemporaneously inserting indicators into a webpage for links embedded in a webpage via a web browser in accordance with embodiments of the present disclosure.

FIG. 14 is a flowchart illustrating an exemplary process 1400 for contemporaneously inserting indicators into a webpage for links embedded in a webpage via a web browser. At step 1402, the web browser can navigate to and open a webpage in a browser window or tab. The webpage can include one or more links to other URLs embedded therein. As one example, the webpage can include results of a search performed by one or more search engines, such as a search engine in an online marketplace. Each link in the database can be accompanied in the webpage with information about the content at the URL identified by the link. At step 1404, in response to navigating to the webpage including the links, the browser extension can be executed to extract the links from the webpage and send the URLs associated with the links to an embodiment of the portal.

At step 1406, for each link, the portal can query the database to determine whether URL associated with each link is in the database, and at step 1408, portal can transmit the results of the query to the browser extension. At step 1410, the browser extension can be executed to modify the source code of the webpage to insert indicators into the webpage based on whether each URL is in the database and tags associated with each URL in the database.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A method for contemporaneous in-browser tagging and harvesting of digital content in a networked environment, the method comprising:
generating a graphical user interface in a portion of a browser window of a web browser executing on a computing device;
in response to the web browser retrieving a webpage to be rendered in the browser window, extracting at least one uniform resource locator associated with the webpage;
sending a first message including the at least one uniform resource locator from the computing device to a portal in response to extracting the at least one uniform resource locator from a data source hosting the webpage, the portal determines a record in a database that corresponds to the at least one uniform resource locator does not exist and sends a result to the graphical user interface indicating that the record does not exist;
in response to the result, generating, in the graphical user interface or the browser window, at least one indicator to indicate that the record does not exist; and
sending a second message from the computing device to the portal including at least one user-generated tag associated with the at least one uniform resource locator that is input by a user via the graphical user interface,
wherein the record for the at least one uniform resource locator is created by the portal in response to receipt of the second message.

2. The method of claim 1, further comprising:
adding one or more tags including the user-generated tag to the record based on input received from the user via the graphical user interface.

3. The method of claim 2, wherein at least one of the tags indicates whether the webpage associated with the at least one uniform resource locator includes benign or malignant content.

4. The method of claim 3, wherein the at least one indicator is a color of at least a portion of the graphical user interface and the further comprising:
changing the color of the portion of the graphical user interface to indicate that the webpage associated with the at least one uniform resource locator includes benign or malignant content.

5. The method of claim 3, further compromising:
capturing an image of the webpage; and
transmitting the image to a data source of the webpage in response to selection of an option in the graphical user interface.

6. The method of claim 1, further comprising:
populating the graphical user interface with tags retrieved from the record and included in the result in response to the web browser retrieving the web page associated with the uniform resource locator again subsequent to creation of the record.

7. The method of claim 1, wherein the at least one uniform resource locator identifies the webpage.

8. The method of claim 7, further comprising:
inserting the at least one indicator into a browser tab of the web browser to indicate that the webpage associated with the at least one uniform resource locator includes benign or malignant content based on the result received by the graphical user interface from the portal.

9. The method of claim 8, wherein inserting the at least one indicator into the browser tab further comprises:
modifying source code associated with the webpage to include the at least one indicator in the browser tab.

10. The method of claim 1, wherein the at least one of the uniform resource locator associated with the webpage corresponds to at least one link embedded in the webpage.

11. The method of claim 10, further comprising:
inserting the at least one indicator into webpage to indicate that the at least one link embedded in the webpage is directed to benign or malignant content based on the result received by the graphical user interface from the portal.

12. The method of claim 11, wherein inserting the at least one indicator into the webpage further comprises:
modifying source code associated with the webpage to include the at least one indicator in the webpage.

13. The method of claim 1, further comprising:
opening a plurality of webpages including the webpage in a plurality of browser windows or browser tabs; and
performing at least one action on at least a subset of the plurality of browser windows or tabs in response to input from the user received via the graphical user interface.

14. A system for contemporaneous in-browser tagging and harvesting of digital content in a networked environment, the system comprising:
a remote computing system including one or more servers programmed to execute a portal accessible via a network;
at least one computing device, having installed thereon, a web browser,
wherein the at least one computing device is programmed to:
generate a graphical user interface in a portion of a browser window of a web browser;
in response to the web browser retrieving a webpage to be rendered in the browser window, extract at least one uniform resource locator associated with the webpage;
send a first message including the at least one uniform resource locator from the graphical user interface to the portal in response to extracting the at least one uniform resource locator from a data source hosting the webpage, the portal determines a record in a database that corresponds to the at least one uniform resource locator does not exist and sends a result to the graphical user interface indicating that the record does not exist;
in response to the result, generate at least one indicator in the graphical user interface or the browser window indicating that the record does not exist; and
send a second message from the graphical user interface to the portal including at least one user-generated tag associated with the at least one uniform resource locator that is input by a user via the graphical user interface,
wherein the record for the at least one uniform resource locator is created by the portal in response to second message.

15. The system of claim 14, wherein the portal adds one or more tags including the user-generated tag to the record based on input received from the user via the graphical user interface.

16. The system of claim 15, wherein at least one of the tags indicates whether the webpage associated with the at least one of the uniform resource locator includes benign or malignant content, the at least one indicator is a color of at least a portion of the graphical user interface, or the graphical user interface changes the color of the portion of the graphical user interface to indicate that the webpage associated with the at least one uniform resource locator includes benign or malignant content.

17. The system of claim 16, wherein the at least one computing device captures an image of the webpage and transmits the image to a data source of the webpage in response to selection of an option in the graphical user interface by the user.

18. The system of claim 14, wherein the at least one uniform resource locator identifies the webpage or corresponds to a link embedded in the webpage, and the at least one computing device inserts the at least one indicator into a browser tab of the web browser or into the webpage to indicate that the webpage associated with the at least one of the uniform resource locator includes benign or malignant content by modifying a source code associated with the webpage to include the at least one indicator in the browser tab.

19. A non-transitory computer-readable medium storing instructions, wherein execution of the instructions by a processing device causes the processing device to perform a method comprising:

generating a graphical user interface in a portion of a browser window of a web browser executing on a computing device;

in response to the web browser retrieving a webpage to be rendered in the browser window, extracting at least one uniform resource locator associated with the webpage;

sending a first message including the at least one uniform resource locator from the computing device to a portal in response to extracting the at least one uniform resource locator from a data source hosting the webpage, the portal determines a record in a database that corresponds to the at least one uniform resource locator does not exist and sends a result to the graphical user interface indicating that the record does not exist;

in response to the result, generating, in the graphical user interface or the browser window, at least one indicator to indicate that the record does not exist; and sending a second message from the computing device to the portal including at least one user-generated tag associated with the at least one uniform resource locator that is input by a user via the graphical user interface, wherein the record for the at least one uniform resource locator is created by the portal in response to receipt of the second message.

20. The medium of claim 19, wherein execution of the instructions by the processing device causes the processing device to add one or more tags including the user-generated tag to the record based on input received from the user via the graphical user interface.

21. The medium of claim 19, wherein the at least one user-generated tag indicates whether the webpage associated with the at least one of the uniform resource locator includes benign or malignant content, the at least one indicator is a color of at least a portion of the graphical user interface, or the color of the portion of the graphical user interface is changed to indicate that the webpage associated with the at least one uniform resource locator includes benign or malignant content.

22. The medium of claim 19, wherein execution of the instructions by the processor causes the processor to capture an image of the webpage and transmit the image to a data source of the webpage in response to selection of an option in the graphical user interface by the user.

23. The medium of claim 19, wherein the at least one uniform resource locator identifies the webpage or corresponds to a link embedded in the webpage, and execution of the instructions by the processing device causes the processing device to insert the at least one indicator into a browser tab of the web browser or into the webpage to indicate that the webpage associated with the at least one of the uniform resource locator includes benign or malignant content by modifying a source code associated with the webpage to include the at least one indicator in the browser tab.

* * * * *